United States Patent
Stenfelt et al.

(10) Patent No.: US 11,671,831 B2
(45) Date of Patent: Jun. 6, 2023

(54) METHOD AND NODES FOR HANDLING A USER EQUIPMENT'S ACCESS TO A MOBILE COMMUNICATIONS NETWORK

(71) Applicant: Telefonaktiebolaget LM Ericsson (publ), Stockholm (SE)

(72) Inventors: John Stenfelt, Gothenburg (SE); Ramtin Balaghi, Hisings Backa (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 17/838,041

(22) Filed: Jun. 10, 2022

(65) Prior Publication Data

US 2022/0312209 A1    Sep. 29, 2022

Related U.S. Application Data

(63) Continuation of application No. 15/542,750, filed as application No. PCT/EP2015/051719 on Jan. 28, 2015, now Pat. No. 11,375,372.

(51) Int. Cl.
*H04W 12/08* (2021.01)
*H04W 36/32* (2009.01)
(Continued)

(52) U.S. Cl.
CPC ........... *H04W 12/08* (2013.01); *H04L 63/107* (2013.01); *H04W 8/18* (2013.01); *H04W 8/20* (2013.01);
(Continued)

(58) Field of Classification Search
CPC ...... H04W 8/20; H04W 48/04; H04W 84/042
See application file for complete search history.

(56) References Cited

U.S. PATENT DOCUMENTS 8,737,956 B2    5/2014   Stenfelt et al.
2006/0056426 A1  3/2006   Wakameda et al.
(Continued)

FOREIGN PATENT DOCUMENTS

EP    2509347 A2    10/2012
EP    2613597 A1    7/2013
WO    2014117865 A1  8/2014

OTHER PUBLICATIONS

Author Unknown, "Technical Specification Group Services and System Aspects; General Packet Radio Service (GPRS); Service description; Stage 2 (Release 12)," Technical Specification 23.060, Version 12.5.0, 3GPP Organizational Partners, Jun. 2014, 347 pages.

(Continued)

*Primary Examiner* — Samina F Choudhry
(74) *Attorney, Agent, or Firm* — Withrow & Terranova, PLLC

(57) ABSTRACT

The embodiments herein relate to a method in a policy node for handling a UEs access to a mobile communications network. The policy node comprises policy information for the UEs access rights to the mobile communications network. The policy node obtains, from a subscriber database, subscription information for a subscriber associated with the UE. Based on the subscription information and the policy information, the policy node determines which geographical areas comprised in the mobile communications network the UE is allowed or denied access to. The policy node transmits, to a mobility node, access information indicating which geographical areas comprised in the mobile communications network the UE is allowed or denied access to.

19 Claims, 12 Drawing Sheets

(51) Int. Cl.
*H04W 8/18* (2009.01)
*H04L 9/40* (2022.01)
*H04W 36/12* (2009.01)
*H04W 8/20* (2009.01)
*H04W 48/04* (2009.01)
*H04W 84/04* (2009.01)

(52) U.S. Cl.
CPC .......... *H04W 36/12* (2013.01); *H04W 36/32* (2013.01); *H04W 48/04* (2013.01); *H04W 84/042* (2013.01)

(56) References Cited

U.S. PATENT DOCUMENTS

| | | | |
|---|---|---|---|
| 2012/0246325 | A1 | 9/2012 | Pancorbo Marcos et al. |
| 2014/0086177 | A1* | 3/2014 | Adjakple ............. H04W 74/04 370/329 |
| 2015/0005004 | A1* | 1/2015 | Cuervo ................ H04W 64/00 455/456.1 |
| 2015/0117320 | A1* | 4/2015 | Wang ................. H04L 41/0893 370/329 |
| 2017/0374604 | A1 | 12/2017 | Stenfelt et al. |

OTHER PUBLICATIONS

Author Unkown, "Technical Specification Group Services and System Aspects; Policy and charging control architecture (Release 11)," Technical Specification 23.203, Version 11.5.0, 3GPP Organizational Partners, Mar. 2012, 175 pages.

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.4.0, 3GPP Organizational Partners, Mar. 2014, 302 pages.

Author Unknown, "Technical Specification Group Core Network and Terminals; Non-Access-Stratum (NAS) protocol for Evolved Packet System (EPS); Stage 3 (Release 12)," Technical Specification 24.301, Version 12.4.0, 3GPP Organizational Partners, Mar. 2014, 362 pages.

Author Unknown, "Technical Specification Group Core Network and Terminals; Evolved Packet System (EPS) Mobility Management Entity (MME) and Serving GPRS Support Node (SGSN) related interfaces based on Diameter protocol (Release 12)," Technical Specification 29.272, Version 12.5.0, 3GPP Organizational Partners, Jun. 2014, 133 pages.

Author Unknown, "Technical Specification Group Radio Access Network; Evolved Universal Terrestrial Radio Access Network (E-Utran); S1 Application Protocol (S1AP) (Release 12)," Technical Specification 36.413, Version 12.1.0, 3GPP Organizational Partners, Mar. 2014, 285 pages.

Taleb, Tarik et al., "Geographical Location and Load based Gateway Selection for Optimal Traffic Offload in Mobile Networks," Proceedings of the 10th international IFIP TC 6 conference on Networking, vol. Part I, May 9-13, 2011, Valencia, Spain, Springer-Verlag Berlin, Heidelberg, 12 pages.

Non-Final Office Action for U.S. Appl. No. 15/542,750, dated Jan. 25, 2019, 12 pages.

Final Office Action for U.S. Appl. No. 15/542,750, dated Jun. 14, 2019, 10 pages.

Advisory Action for U.S. Appl. No. 15/542,750, dated Sep. 17, 2019, 3 pages.

Examiner's Answer to the Appeal Brief for U.S. Appl. No. 15/542,750, dated Jun. 8, 2020, 7 pages.

Decision on Appeal for U.S. Appl. No. 15/542,750, dated Nov. 18, 2021, 10 pages.

Notice of Allowance for U.S. Appl. No. 15/542,750, dated Feb. 25, 2022, 7 pages.

Examination Report for European Patent Application No. 15701964. 7, dated Nov. 26, 2018, 5 pages.

International Search Report and Written Opinion for International Patent Application No. PCT/EP2015/051719, dated Jul. 7, 2015, 10 pages.

* cited by examiner

METHOD AND NODES FOR HANDLING A USER EQUIPMENT'S ACCESS TO A MOBILE COMMUNICATIONS NETWORK

This application is a continuation of U.S. patent application Ser. No. 15/542,750, filed Jul. 11, 2017, which is a 35 U.S.C. § 371 national phase filing of International Application No. PCT/EP2015/051719, filed Jan. 28, 2015, the disclosures of which are incorporated herein by reference in their entireties.

TECHNICAL FIELD

Embodiments herein relate generally to a policy node, a method in the policy node, a mobility node and a method in the mobility node. More particularly the embodiments herein relate to handling a User Equipment's (UE) access to a mobile communications network.

BACKGROUND

PCC Architecture

Policy and Charging Control (PCC) was originally introduced in Third Generation Partnership Project (3GPP) standards as a mean to secure resources in the access network mainly for dynamic services (such as Internet protocol based Multimedia Services (IMS)), but also to control resource consumption for regular Internet services (e.g. Point to Point (P2P) traffic, web-browsing, File Transfer Protocol (FTP) etc.) and to enable Flow Based Charging (FBC). Although the original goal with PCC has since long time been completed in the 3GPP, there is still a lot of activities ongoing in standards enhancing the PCC framework with add-ons.

An example embodiment of an architecture that supports the PCC functionality is depicted in FIG. 1. The PCC functionality illustrated in FIG. 1 is for an Evolved 3GPP Packet Switched (PS) domain, including both 3GPP accesses and Non-3GPP accesses. Some examples of 3GPP access are GSM EDGE Radio Access Network (GERAN), Universal Terrestrial Radio Access Network (UTRAN) and Evolved UTRAN (E-UTRAN). GSM is short for Global System for Mobile Communications and EDGE is short for Enhanced Data rates for GSM Evolution.

The Policy Control and Charging Rules Function (PCRF) 101 in FIG. 1 is a functional element or node that encompasses policy control decision and flow based charging control functionalities. Policy control may be described as the process where the PCRF 101 indicates to a Policy and Charging Enforcement Function (PCEF) 102 how to control the Internet Protocol- Connectivity Access Network (IP-CAN) bearer. The PCRF 101 provides network control regarding the service data flow detection, gating, Quality of Service (QoS), Application Detection and Control (ADC) and flow based charging (except credit management) towards the PCEF 102. The PCRF 101 receives session and media related information from the Application Function (AF) 103 and informs the AF 103 of traffic plane events. The PCRF 101 also receives information about services in use from a Traffic Detection Function (TDF) 105 and informs the TDF 105 about IP-CAN session specific information. An IP-CAN session may be described as an association between a UE and an Internet Protocol (IP) network.

The PCRF 101 may provision PCC Rules and ADC to the PCEF 102 via the Gx reference point. The PCRF 101 may provision ADC Rules to the TDF 105 via the Sd reference point.

The PCRF 101 may inform the PCEF 102 and the TDF 105 through the use of PCC and ADC rules on the treatment of each service data flow that is under PCC/ADC control, in accordance with the PCRF 101 policy decision(s).

The AF 103 is node or an element offering applications in which service is delivered in a different layer (i.e. transport layer) from the one where the service has requested the control of IP bearer resources according to what has been negotiated (i.e. signaling layer). One example of an AF 103 is the Proxy-Call Session Control Function (P-CSCF) of the IP Multimedia Core Network (IM CN) subsystem. The AF 103 may communicate with the PCRF 101 to transfer dynamic session information (i.e. description of the media to be delivered in the transport layer). This communication is performed using the Rx interface.

The PCEF 102 encompasses service data flow detection (based on the filter definitions included in the PCC and ADC rules), as well as online and offline charging interactions (not described here) and policy enforcement. Since the PCEF 102 is the entity handling the bearers it is where the QoS is being enforced for the bearer according to the QoS information coming from the PCRF 101. This functional entity may be located at a Gateway 108 (e.g. Gateway GPRS Support Node (GGSN) in the General Packet Radio Services (GPRS) case, and Packet Data Network-GateWay (PDN-GW) in the Evolved Packet System (EPS) case). For the cases where there is Proxy Mobile IPv6 (PMIP) instead of GPRS Tunneling protocol (GTP) protocol between the Bearer Binding and Event Reporting Function (BBERF) 110 and PCEF 102, the bearer control is done in the BBERF 110 instead.

The BBERF 110 may be described as a node which performs e.g. bearer binding, uplink bearer binding verification, event reporting to the PCRF 101, sending or receiving IP CAN-specific parameters, to or from the PCRF 101 etc. The Gxx reference point resides between the PCRF 101 and the BBERF 110.

The Subscription Profile Repository (SPR) 113 is an entity, e.g. a logical entity, which comprises substantially all subscriber/subscription related information needed for subscription-based policies and IP-CAN bearer level PCC rules by the PCRF 101. The SPR 113 may be combined with or distributed across other databases in the operator's network. The Sp reference point lies between the SPR 113 and the PCRF 101.

The Online Charging System (OCS) 115 is a node which performs online credit control functions. The OCS 115 may trigger the PCEF 102 to initiate an IP-CAN bearer service termination at any point in time. The Sy reference point resides between the PCRF 101 and the OCS 115. The Gy reference point resides between the OCS 115 and the PCEF 102. The Gyn reference point resides between the OCS 115 and the TDF 105.

There may be several Offline Charging Systems (OFCS) 118 in a Public Land Mobile Network (PLMN). The default OFCS 118 addresses (i.e. the primary address and the secondary address) may be locally pre-configured within the PCEF 102 and the TDF 105. OFCS 118 addresses may also be passed once per IP-CAN session or TDF 105 session from the PCRF 101 to the PCEF 102 or TDF 105. The addresses provided by the PCRF 101 may have a higher priority than the pre-configured ones. The Gzn reference point resides between the TDF 105 and the OFCS 118. The Gz reference point resides between the PCEF 102 and the OFCS 118.

MME/SGSN-PCRF Interface

The MME/SGSN-PCRF reference point is a reference point which resides between the MME/SGSN and the PCRF.

MME is short for Mobility Management Entity and SGSN is short for Serving GPRS Support Node. The SGSN may also be referred to as a S4-SGSN. The reference point may also be referred to as an interface. The MME/SGSN may be referred to as a mobility node and may comprise the functions of the MME and the SGSN, i.e. the MME and the SGSN may be co-located in one node. The MME/SGSN provides packet-data switching and mobility/session management.

The MME/SGSN-PCRF interface is initiated by the MME/SGSN e.g. during Initial Attach, Packet Data Protocol (PDP)-context activation prior to sending a Crete Session Request message towards the Serving GateWay (SGW) from the MME/SGSN. The MME/SGSN-PCRF interface may also be initiated by a new MME/SGSN during applicable EPS/GPRS procedures when there is a MME/SGSN change (e.g. during a Tracking Area Update (TAU) and Routing Area Update (RAU) with a MME/SGSN change).

The MME/SGSN-PCRF interface may be session based, i.e. stateful, per Packet Data Network (PDN) connection or per PDP context. The PCRF may subscribe to updates of certain information from the MME/SGSN e.g. Radio Access Technology (RAT), location information etc. for a certain MME/SGSN-PCRF session. When the subscribed information change for the concerned PDN connection or PDP context, the MME/SGSN may initiate a new message for the associated MME/SGSN-PCRF-session to inform the PCRF of the updated information. The PCRF may also provision updated policy decisions for a PDN connection or a PDP context to the MME/SGSN in an unsolicited manner over the associated MME/SGSN-PCRF session at any time e.g. depending on internal or external events that may affect the policies.

The functionality of the MME/SGSN-PCRF interface may include e.g.:
- Reporting of user location information to the PCRF over the MME/SGSN-PCRF interface.
- Provisioning of Subscriber Profile ID/RAT/Frequency Selection Priority (SPID/RFSP) index from the PCRF to the MME/SGSN over the MME/SGSN-PCRF interface.
- PDN-GW selection from the PCRF to the MME/SGSN over the MME/SGSN-PCRF interface.
- Access Point Name (APN) selection from the PCRF to the MME/SGSN over the MME/SGSN-PCRF interface.
- UE-Aggregate Maximum Bit Rate (UE-AMBR) provisioning from the PCRF to the MME/SGSN over the MME/SGSN-PCRF interface.
- Provisioning of Radio Access Network (RAN) inactivity timers from the PCRF to the MME/SGSN over the MME/SGSN-PCRF interface.

RSZI

Regional Subscription Zone code Identity (RSZI) is a 3GPP Release 8 (Rel-8) feature which intends to make it possible for the operator to freely and with great flexibility either restrict or allow a single specific subscriber in any preconfigured Geographical Area (GA) of the subscriber's current PLMN. Each geographical area corresponds to a so called Zone Code. FIG. 2 illustrates an overview of the RSZI.

The feature has as a prerequisite that the PLMN is divided into geographical areas. For E-UTRAN access, each geographical area may consist of one or several Tracking Areas (TAs), and for UTRAN and GERAN access, the geographical area may consist of one or more Routing Areas (RA).

The maximum number of TAs is the number of TAs that the PLMN is covering, and the maximum number of RAs is the number of RAs that the PLMN is covering.

There are two local configurations needed in the system. Firstly the Home Subscriber Server (HSS) 201 which holds the maximum number of 10 Zone Codes for each subscriber and the current PLMN (indicated with ZC1 . . . ZC10 in FIG. 2). This list of the zone codes is a part of subscription data per UE that the HSS 201 sends to the MME 203 during different mobility procedures such as Attach, TAU and handover when an Update Location procedure takes place. Note that an Update Location procedure does not take place e.g. during periodic TAU or during certain intra-MME TAU scenarios when the UE remains in a TA within the same TA-list. The HSS 201 has the possibility to either delete the existing Zone Codes or to modify them. The HSS 201 does not hold any access information.

Secondly, the MME 203 needs to be configured with the access information and corresponding Zone Codes which may differ from the Zone Codes held by the HSS 201. If they differ then it means that the RSZI is not active and other restriction and access policies rule.

At the MME 203, a ZC_profile is created and associated to an International Mobile Subscriber Identity Number Series (IMSINS) and then a list is created and associated to the profile to contain the Zone Codes. This list is per PLMN and user specific and is tagged with a rule: Either allow or restrict. The Zone Codes are created and associated to the lists. Then the defined geographical areas with respect to which TAs they cover are associated to the Zone Codes. As an example, FIG. 2 illustrates a ZC_List for UE1 with allowed zones, a ZC_List for UE2 with restricted zones and a ZC_List for UE3 with allowed zones.

When the configuration is done and the subscriber is associated with one or several Zone Codes then the access information is managed.

For E-UTRAN access, at the end of each mobility procedure, the MME 203 sends an updated Handover Restriction List (HRL) towards the RAN node, e.g. an evolved NodeB (eNB) 205, and an updated Non Access Stratum (NAS) Equivalent PLMN List towards the UE 208. For UTRAN access (i.e. 3G), the SGSN may perform a similar procedure. In UTRAN, the Shared Network Access (SNA) codes may be seen as being similar to the HRL. The SNA codes are sent from the SGSN to the RAN node. Based on the SNA codes, the restrictions may be decided.

The HRL contains the information that the eNB 205 needs when a Handover procedure is about to be initiated. The HLR is exemplified in FIG. 2 as TA1 . . . TAmax. The forbidden TAs may be for example maximum 65536. The NAS Equivalent PLMN List contains the information that the UE 208 needs to know which PLMNs are allowed for the subscriber. In FIG. 2, the NAS Equivalent PLMN List is exemplified to be PLMN1 . . . PLMN16. The updating of these two lists is based on the comparison of the ZCs received from the HSS 201 and the ones configured at the MME 203. The list will be filtered if there are any matches based on the rule.

An exemplary use case for the RSZI is PLMN access for national roamers in a certain area such as a city (e.g. Las Vegas). Another use case for the RSZI may be when an operator would like to have a restrictive access policy for densely populated traffic areas during busy hours. Restrictive access policies could also be relevant to apply e.g. close to sensitive buildings or sensitive areas where for security reasons (e.g. in a close proximity to the Pentagon or the Kreml).

From an operator's point of view, the RSZI is a complicated feature to configure and maintain.

For the MME/SGSN configuration, the number of GAs and ZCs could easily become unmanageable for the MME/SGSN. This may be a problem for example where e.g. the number of applicable zone codes may be more than 100.

Each list, containing ZCs, associated with a UE and the current PLMN must have only one kind of permission, either allow or restrict. This means that the UE may explicitly be either allowed or restricted and implicitly the opposite in the remaining areas of the current PLMN. This is complicated enough. But when the RSZI collides with the Roaming Restriction (RR) it will be more complicated. When the RSZI indicates explicitly allowed, then the RR is overridden. But when the RSZI indicates implicitly allowed, then the RSZI shall be overridden by the RR. To summarize, a very complicated logic is needed especially when taking roaming restriction aspects into account.

The RSZI requires a very static and inflexible configuration of the HSS. The operator configures the HSS with maximum of 10 ZCs per user and its current PLMN. If new ZCs are needed then re-configuration must take place.

With the limitation on maximum number of ZCs in the HSS and the absence of an automatic synchronization of the configuration in the MME/SGSN and the HSS, there is a huge risk for configuration mismatch. Note that it very likely that a configuration mismatch may be undetected by a governing network management system as long as the configurations in the SGSN/MME and the HSS are still syntactically correct.

The possible and perhaps needed huge number of ZCs and GAs will lead to unnecessary problems at maintenance and trouble shooting.

The standard/existing functionality for the RSZI may also be considered to be rather inflexible and static. Zone Codes are provided during Attach/PDP-Context activation and in addition at an Update Location Request, i.e. at MME/SGSN change when the UE moves out of range from the current TA-list. This implies that a UE may actually move within a rather large geographical area (i.e. within all TAs in the same TA-list) without the Update Location Request being issued towards the HSS. Thus, even if the HSS would implement some form of smart logic that adapts the provided ZCs to the MME/SGSN for a certain UE based on location, this information could not be updated very often.

SUMMARY

An objective of embodiments herein is therefore to obviate at least one of the above disadvantages and to provide improved handling of a UEs access to a mobile communications network.

According to a first aspect, the object is achieved by a method in a policy node for handling a UEs access to a mobile communications network. The policy node comprises policy information for the UEs access rights to the network. The policy node obtains, from a subscriber database, subscription information for a subscriber associated with the UE. Based on the subscription information and the policy information, the policy node determines which geographical areas comprised in the mobile communications network the UE is allowed or denied access to. The policy node transmits, to a mobility node, access information indicating which geographical areas comprised in the mobile communications network the UE is allowed or denied access to.

According to a second aspect, the object is achieved by a method in a mobility node for handling a UEs access to a mobile communications network. The mobility node receives, from a policy node, access information indicating which geographical areas comprised in the mobile communications network the UE is allowed or denied access to. The access information is based on subscription information for a subscriber associated with the UE and policy information for the UEs access rights to the mobile communications network. The mobility node creates handover restriction information based on the received access information from the policy node. The mobility node transmits the handover restriction information to a RAN node.

According to a third aspect, the object is achieved by a policy node for handling a UEs access to a mobile communications network. The policy node comprises policy information for the UEs access rights to the mobile communications network. The policy node is arranged to obtain, from a subscriber database, subscription information for a subscriber associated with the UE. The policy node is arranged to, based on the subscription information and the policy information, determine which geographical areas comprised in the mobile communications network the UE is allowed or denied access to. The policy node is arranged to transmit, to a mobility node, access information indicating which geographical areas comprised in the mobile communications network the UE is allowed or denied access to.

According to a fourth aspect, the object is achieved by a mobility node for handling a UEs access to a mobile communications network. The mobility node is arranged to receive, from a policy node, access information indicating which geographical areas comprised in the mobile communications network the UE is allowed or denied access to. The access information is based on subscription information for a subscriber associated with the UE and policy information for the UEs access rights to the mobile communications network. The mobility node is arranged to create handover restriction information based on the received access information from the policy node. The mobility node is arranged to transmit the handover restriction information to a RAN node.

Since the access to the geographical areas in the mobile communications network is based on both the subscription information and the policy information, the handling of the UEs access to the mobile communications network is improved.

Embodiments herein afford many advantages, of which a non-exhaustive list of examples follows:

By allowing for the policy node to dynamically set access restriction—both geographically and per access (e.g. 3G and 4G) the embodiments herein provide an advantage of regional subscriptions with a usage limit (volume or time). For example, 4G access in inner London limited to 100 MB per day for bronze level subscriptions. After 100 MB only Second Generation (2G) and Third Generation (3G) access is allowed for the user until the next day. Another advantage may be an emergency lockout of arbitrary geographical area for 3G and/or Fourth Generation (4G) for a PLMN. In a disaster situation, 4G access for a certain PLMN in the affected area is allowed (only) for public safety users (normally it may be so that they do not have access to this PLMN). When this happens all normal users may be restricted to 2G and 3G access in the same area if needed. This requires public safety authorities to integrate with the policy node.

A further advantage is that the embodiments herein yield optimization for low Average Revenue Per User (ARPU)

countries. For example, 3G and/or 4G access in high density areas are usage limited. However, when a user reach his/hers limit an Short Message Service (SMS) is sent with information on less dense/congested areas where 3G/4G usage is not limited.

In addition to the advantages mentioned above, there are also advantages related to OPerational EXpenditure (OPEX) savings and increased flexibility for an operator with the embodiments herein. Since the control has been centralized to the policy node, there is no longer a need to configure or re-configure the mobility with GA access rights per UE International Mobile Subscriber Identity (IMSI) series. Another advantage is that there is no longer a need to configure the mobility node and the subscriber database with ZCs. With a single point of control the risk for misalignment between the subscriber database and the mobility node, configurations are efficiently eliminated.

Another advantage of the embodiments herein is that there is no need to map ZC to the MME/SGSN local configuration (processing saving). With the embodiments herein, access restrictions may be changed by the policy node at any time on the fly. This is impossible with the standard RSZI functionality since access restrictions needs to be configured in the mobility node but is updated only in the subscriber server.

The embodiments herein are superior compared to the current technology both in terms of flexibility and with regard to OPEX.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The RSZI is a 3GPP Rel-8-feature which intends to make it possible for the operator to either restrict or allow a single specific subscriber in any preconfigured geographical area of the subscriber's current PLMN. This feature requires complicated configuration in the HSS and in the MME/SGSN. The feature is also rather demanding from a processing point of view for the MME/SGSN. The standardized version of RSZI offers no support for dynamic changes of access restrictions based on e.g. data usage.

The current technology is rather blunt/one-dimensional considering that dynamic conditions cannot be taken into account i.e. traffic density, time of the day, data usage etc. This implies that an operator cannot create value packs/ subscriptions that take such dynamic conditions into considerations.

The embodiments herein therefore allow for the mobility node to request access information from the policy node over a direct interface and to allow the policy node to provide this information to the mobility node based on subscription and IP-CAN session specific information such as location, accumulated data usage, terminal type etc.

Figure 1:
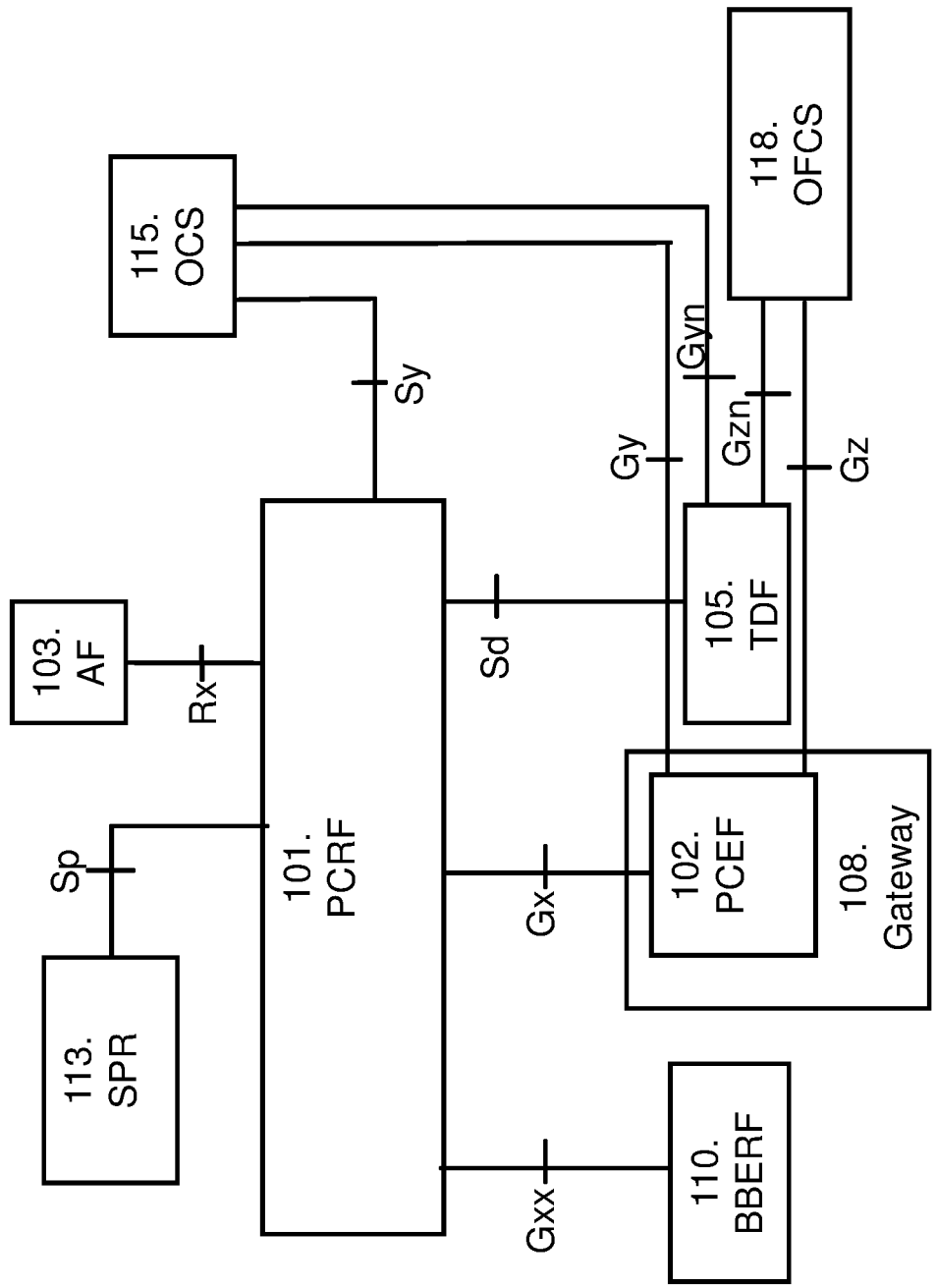
FIG. 1 is a schematic block diagram illustrating embodiments of a PCC architecture.
Figure 2:
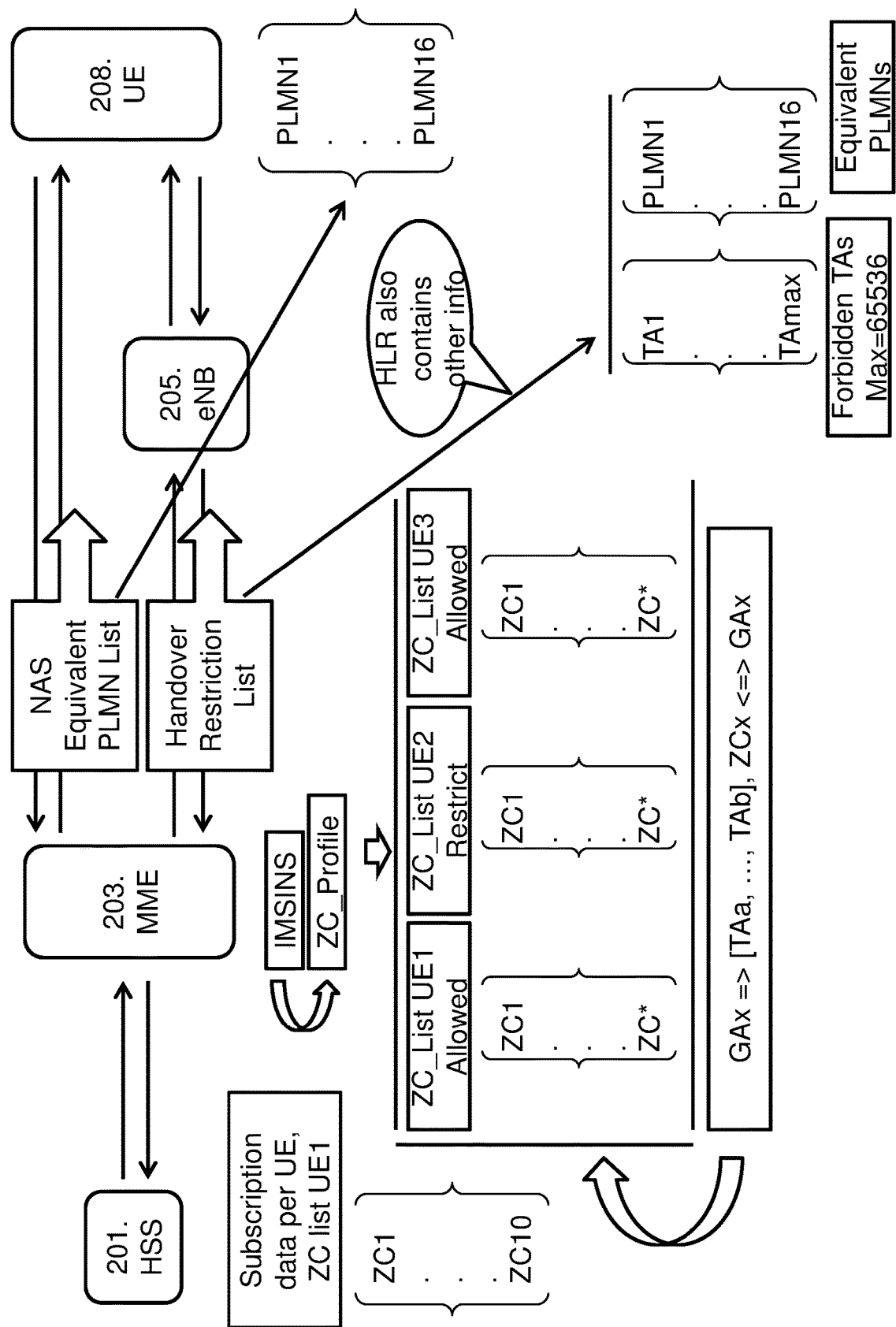
FIG. 2 is a schematic block diagram illustrating RSZI.
Figure 3:
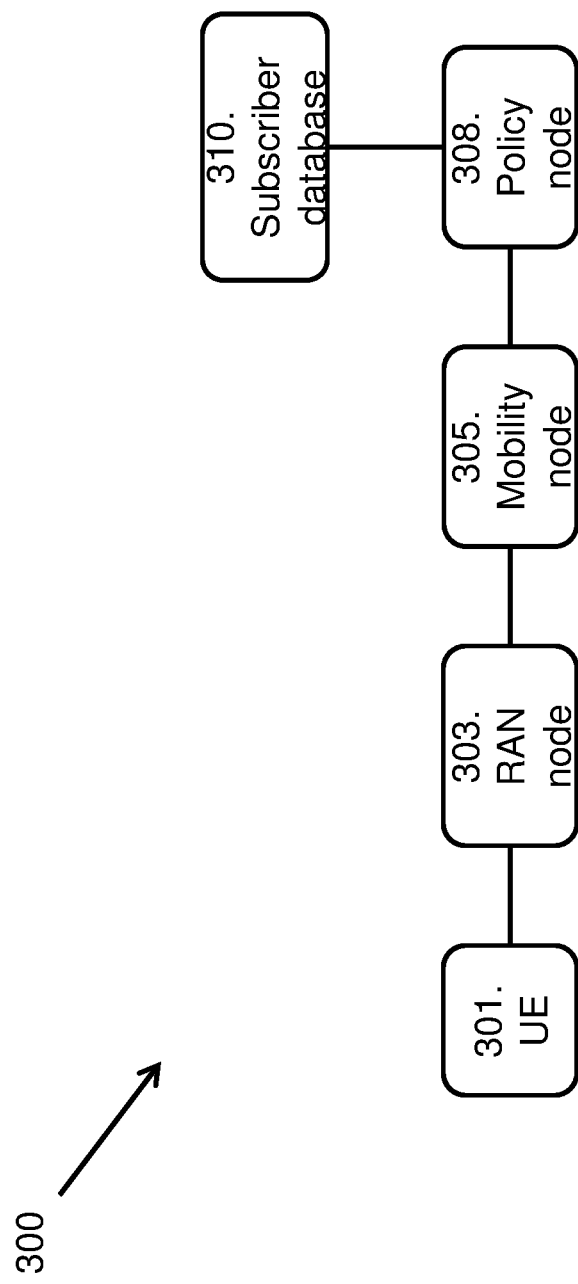
FIG. 3 is a schematic block diagram illustrating embodiments of a communications system.

FIG. 3 depicts a communications system 300 in which embodiments herein may be implemented. The communications network 300 may in some embodiments apply to one or more radio access technologies such as for example 2G, 3G, 4G, Fifth Generation (5G) or any other 3GPP radio access technology, or other radio access technologies such as Wireless Local Area Network (WLAN). The communications system 300 may also be referred to as e.g. a wireless communications network, a wireless communications system, a communications network, a network or a system.

The communications system 300 comprises a UE 301 served by a RAN node 303 and is in this case capable of communicating with the RAN node 303 over a communications link.

The UE 301 may be a device by which a subscriber may access services offered by an operator's network and services outside operator's network to which the operator's radio access network and core network provide access, e.g. access to the Internet. The UE 301 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 301 may be portable, pocket storable, hand held, computer comprised, or vehicle mounted devices, enabled to communicate voice and/or data, via the radio access network, with another entity, such as another UE or a server.

The RAN node 303 may be a base station such as a NodeB, an eNodeB, Radio Network Controller (RNC), or any other network unit capable to communicate over a radio carrier with the UE 301.

As seen in FIG. 3, the communications system 300 further comprises a mobility node 305, a policy node 308 and a subscriber database 310.

The mobility node 305 is a node which is arranged to control and handle the mobility of the UE 301. This may also be described as providing packet-data switching and mobility/session management. The mobility node 305 may be an MME (e.g. in a 4G system), a SGSN (e.g. in a 2G or 3G system) or a combined MME and SGSN node. The combined node may be referred to as MME/SGSN. The SGSN may be referred to as a S4-SGSN. The mobility node 305 may be arranged to communicate with the RAN node 303 and the policy node 308, and possibly also with other nodes in the communications system 300.

The policy node 308 is a node which is arranged to handle policies and charging associated with the UE 301. The policy node 308 may be for example a PCRF. The policy node 308 may be arranged to communicate with the mobility node 305 and the subscriber database 310.

The subscriber database 310 is a database which is arranged to comprise subscriber information per PDN. Such subscriber information may be for example information about a subscriber's allowed services, Information about a subscriber's allowed QoS (e.g. Maximum Bit Rate (MBR) and Guaranteed Bit Rate (GBR)), a subscriber's charging related information, subscriber category information etc. The subscriber information may also be referred to as subscription information. The subscriber database 310 may be a SPR or a front-end to a HSS.

In some embodiments, the RAN node 303 may be seen as being located in a radio access network, and the mobility node 305, the policy node 308 and the subscriber database 310 may be seen as being located in a core network.

It should be noted that the communication links between the nodes in the communications system 300 may be of any suitable kind including either a wired or wireless link. The links may use any suitable protocol depending on type and level of layer (e.g. as indicated by the Open Systems Interconnection model (OSI) model).

The communications system 300 may comprise additional nodes which are not illustrated in FIG. 3. An example of some of these nodes will be illustrated in and described with reference to FIG. 4 below.

Figure 4:
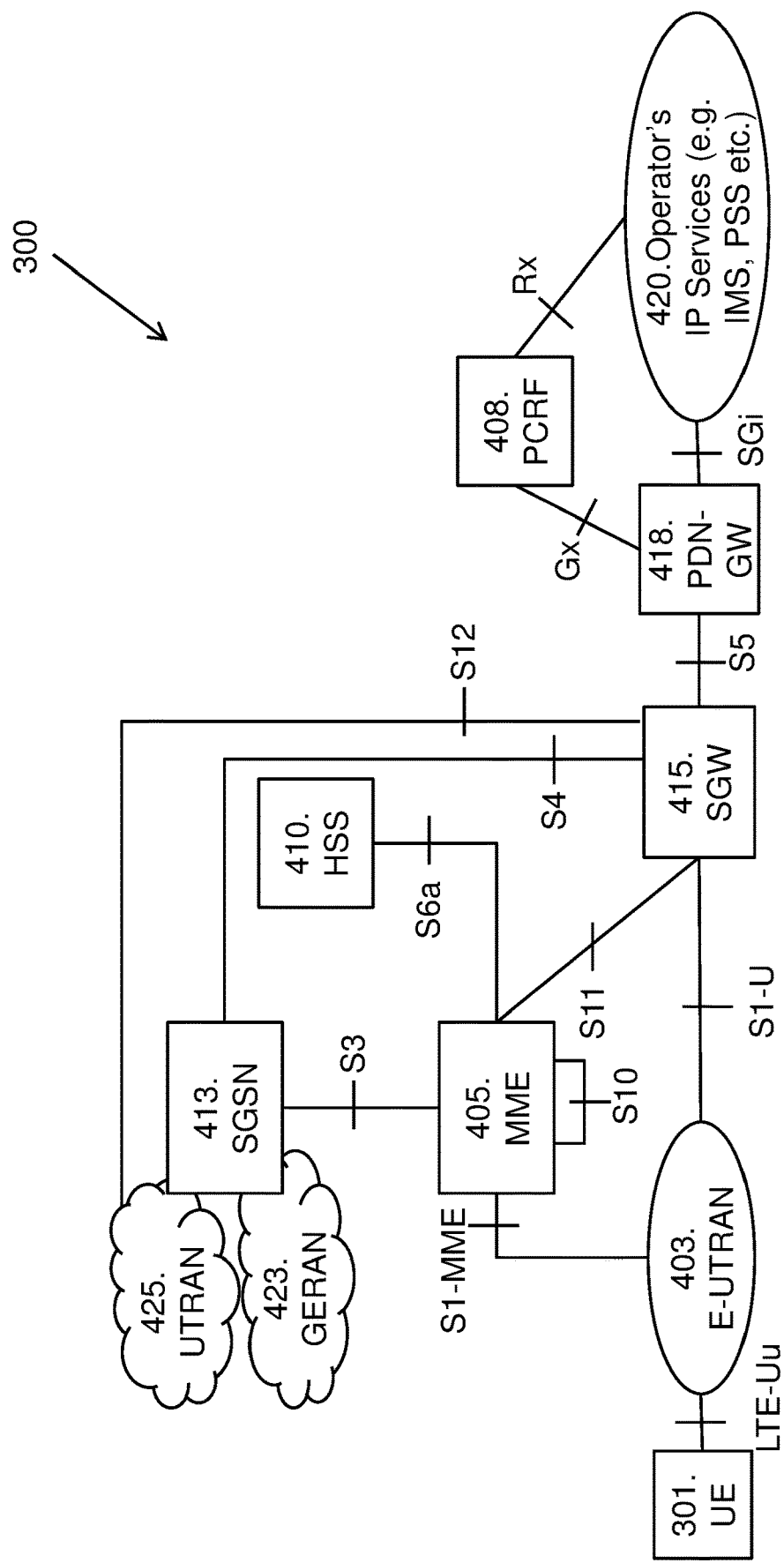
FIG. 4 is a schematic block diagram illustrating embodiments of a communications system.

FIG. 4 depicts a detailed exemplary architecture model of the communications system 300 in FIG. 3. The example illustrated in FIG. 4 applies the radio access technology referred to as E-UTRAN or Long Term Evolution (LTE).

The communications system 300 illustrated in FIG. 4 comprises a UE 301 which is served by a RAN node 303 (not illustrated in FIG. 4). The RAN node 303 is comprised in the E-UTRAN 403. As mentioned earlier, the RAN node 303 may be for example an eNB or any other element capable to communicate with the UE 303. The reference point between the UE 301 and the E-UTRAN 403 may be referred to as LTE-Uu.

A MME 405 may be connected to the E-UTRAN 403 via the reference point S1-MME. The MME 405 may be described as an element or node having functions such as e.g. NAS signaling, Inter Core Network node signaling for mobility between 3GPP access networks, UE reachability, TA list management, PDN-GW and SGW selection, MME selection for handover with MME change etc. S10 is the reference point between MMEs 405 for MME relocation and MME to MME information transfer. The MME 405 is an example of the mobility node 305 in FIG. 3.

The communications system 300 may comprise two gateways, i.e. the SGW 415 and the PDN-GW 418. The SGW 415 and the PGW 418 may be implemented in one physical node or in separate physical nodes. The SGW 415 is the gateway which terminates the interface towards E-UTRAN 403. The reference point between the SGW 415 and the E-UTRAN 403 for the per bearer user plane tunneling and inter eNodeB path switching during handover may be referred to as S1-U. The SGW 415 routes and forwards user data packets, while also acting as the mobility anchor for the user plane during inter-eNodeB handovers and as the anchor for mobility between LTE and other 3GPP technologies (relaying the traffic between 2G/3G systems and the PDN-GW 418) etc. S11 is the reference point between the SGW 415 and the MME 405.

The PDN-GW 418 may be described as the gateway which terminates the SGi interface towards the PDN. The PDN is illustrated in FIG. 4 by the Operator's IP Services (e.g. IMS, PSS etc.) 420. PSS is short for Packet Switched Streaming. If the UE 301 is accessing multiple PDNs, there may be more than one PDN-GW 418 for that UE 301. Functions of the PDN-GW 418 are e.g. providing connectivity from the UE 301 to external PDNs by being the point of exit and entry of traffic for the UE 301, performing policy enforcement, packet filtering for each user, charging support, lawful interception and packet screening etc. S5 is the reference point which provides user plane tunneling and tunnel management between the SGW 418 and the PDN-GW 418.

The SGSN 413 is a node which is responsible for the delivery of data packets from and to the UE's 301 within its geographical service area. One of the SGSN's 413 functions is to provide signaling for mobility between 2G/3G and E-UTRAN 403 3GPP access networks. 2G/3G access network are exemplified with GERAN 423 and UTRAN 425 in FIG. 4. Some further functions of the SGSN 413 are to handle packet routing and transfer, mobility management (attach/detach and location management), logical link management, and authentication and charging functions etc. S3 is the interface between the SGSN 413 and the MME 405. S4 is a reference point between the SGSN 413 and the SGW 415. S12 is the reference point between the SGW 415 and the UTRAN 425.

The HSS 410 is a subscriber server node similar to the GSM Home Location Register (HLR) and Authentication Centre (AuC). The HSS 410 comprises subscription-related information (subscriber profiles), performs authentication and authorization of the user, and may provide information about the subscriber's location and IP information. The reference point S6a enables transfer of subscription and authentication data for authenticating/authorizing user access to the evolved system (AAA interface) between the MME 405 and the HSS 410.

The PCRF 408 is a policy and charging control element. The PCRF 408 encompasses policy control decision and flow based charging control functionalities, it provides network control regarding the service data flow detection, gating, QoS and flow based charging etc. The PCRF 408 may be described as a functional entity which may be a standalone node or a function implemented in another node. The PCRF 408 may be an example of the policy node 308 illustrated in FIG. 3.

The reference point Gx provides transfer of (QoS) policy and charging rules from the PCRF 408 to a PCEF in the PDN-GW 418.

Rx is the reference point which resides between the PCRF 408 and the Operator's IP Services 420. The Rx reference point is used to exchange application level session information between the PCRF 408 and the AF.

Similar to FIG. 3, it should be noted that the communication links in the communications system illustrated in FIG. 4 may be of any suitable kind including either a wired or wireless link. The link may use any suitable protocol depending on type and level of layer (e.g. as indicated by the (OSI model).

The method for handling the UEs 301 access to a mobile communications network (e.g. a PLMN), according to some embodiments will now be described with reference to the signaling diagram depicted in FIG. 5. The UEs 301 access to the mobile communications network may also be described as the UEs 301 access rights to PLMNs specified per radio access technology. The method illustrated in FIG. 5 comprises at least some of following steps, which steps may as well be carried out in another suitable order than described below.

Step 500

The mobility node 305 may send a request message to the policy node 308. The request message is a request for access information, i.e. a request for information which indicates which geographical areas in the mobile communications network the UE 301 is allowed access to or denied access to or both allowed and denied access to. The request message may comprises a UE 301 identity, network identity (e.g. PLMN ID), information indicating a radio access technology applied by the network, an area identity indicating a logical or geographical region within the network (e.g. Routing Area Identity (RAI) or Tracking Area Identity (TAI)) etc.

Step 501

The policy node 308 obtains subscription information for a subscriber associated with the UE 301. In some embodiments, the policy node 308 may send a request for the subscription information to the subscriber database 310 and receive the subscription information as a response to the request message. In other embodiments, the policy node 308 may receive the subscription information from the subscriber database 310 without sending any request, e.g. it may receive the information on a regular basis or when the information has been updated. The subscription information may be organized in any suitable format such as e.g. a list, a table etc.

A subscriber may remove his/hers SIM card from the UE 301 and use another UE 301 to access the mobile communications network. In such scenario, the subscription information will still be the same since it is for the subscriber, and not for the UE 301.

Step 502

The policy node 308 determines which geographical areas in the mobile communications network the UE 301 is allowed access to or denied access to or both allowed and denied access to. The policy node 308 may take this decision based on the subscription information obtained in step 501 and also based on policy information for the UEs 301 access rights to the mobile communications network. The policy information for the UEs 301 access rights to the mobile communications network may be information which the policy node 308 has previously received or information which is preconfigured in the policy node 308.

For example, the UE 301 associated with the subscriber which the received subscription information relates to, may be allowed to access geographical areas 1, 2 and 5 and denied access to graphical areas 3 and 4.

For a regional subscription, a geographical area may be allowed for example during a certain time of day, when a user is using a certain type of UE 301, as long as the user has not surpassed its usage limit (e.g. Megabytes or time) for a pre-defined time given by the subscription e.g. current month. Access may also be allowed based on a combination of subscription type (e.g. gold, silver, bronze) and network load e.g. bronze users are allowed in an area during times of low to medium load. Access to an area may be denied in scenarios which are opposite of the allowed scenarios. For example, bronze users may not be allowed in a geographical area when there is a high risk for congestion. Another example may be that a user may not be allowed in a geographical area of a PLMN when a usage limit has been surpassed e.g. access to 4G in Las Vegas is limited to 100 MB per day.

Step 503

The policy node 308 sends access information to the mobility node 305. The access information indicates which geographical areas in the mobile communications network the UE 301 is allowed or denied access to, i.e. the result of the decision taken in step 502. The access information may be per radio access technology and per PLMN identity. This step may be a response to the request message in step 500.

Step 504

Based on the received access information, the mobility node 305 creates at least one of handover information and equivalent network information.

The handover information indicates which geographical areas the UE 301 associated with the specific subscriber is forbidden to access, it may indicate which geographical areas the UE 301 is allowed to access or indicate both which geographical areas the UE 301 is forbidden and allowed to access. The handover information may comprise information about geographical and logical regions, e.g. TA, Location Area (LA) and PLMN. The handover information may be for example a HRL. The handover information may be transmitted to the RAN node 303.

The equivalent network information may be for example a NAS equivalent PLMN list. The NAS equivalent PLMN list is list of PLMNs that are not the Home PLMN of the UE 301, but that the UE 301 may treat as being equal to its home PLMN. This is used in network sharing situations when two operators have an agreement to allow the other operator's customers into their RANs for coverage or capacity reasons.

Step 505

The mobility node 305 transmits the handover information to the RAN node 303. With the handover information, the RAN node 303 may steer a UE 301 in connected state into selecting a target PLMN and Geographical Area, e.g. TA for E-UTRAN and RA for GERAN and UTRAN accesses, during handover procedures.

The handover information (e.g. a HRL) may send over the S1-MME interface to the RAN node 303. The handover information may be sent in message such as e.g.:
  Downlink NAS transport message (This message is sent by the mobility node 305 and is used for carrying NAS information over the S1 interface).
  Handover Request message (This message is sent by the mobility node 305 to the target RAN node 303 to request the preparation of resources).

Initial context setup request (This message is sent by the mobility node 305 to request the setup of a UE context).

Step 506

The mobility node 305 may send the equivalent network information to the UE 301. With the equivalent network information, the UE 301 in idle state may be steered into selecting a target PLMN during procedures such as attach, Tracking Area Update (applicable to E-UTRAN), and Routing Area Update (applicable to UTRAN and GERAN). The handover information and the equivalent network information are created by mobility node 305 and stored at the mobility node 305.

The equivalent network information may be sent e.g. using the NAS protocol, to the UE 301. The transmission of the equivalent network information may be transparent to the RAN node 303. The equivalent network information may be sent in messages such as e.g.:

Tracking area update accept (This message is sent by the network, e.g. the mobility node 305, to the UE 301 to provide the UE 301 with EPS mobility management related data in response to a tracking area update request message).

Attach accept (This message is sent by the network, e.g. the mobility node 305, to the UE 301 to indicate that the corresponding attach request has been accepted).

In some embodiments, the mobility node 305 does not create the equivalent network information. In such embodiment, the mobility node 305 sends the access information further to the UE 301, and the UE 301 is the one which creates the equivalent network information based on the received access information.

Figure 6:
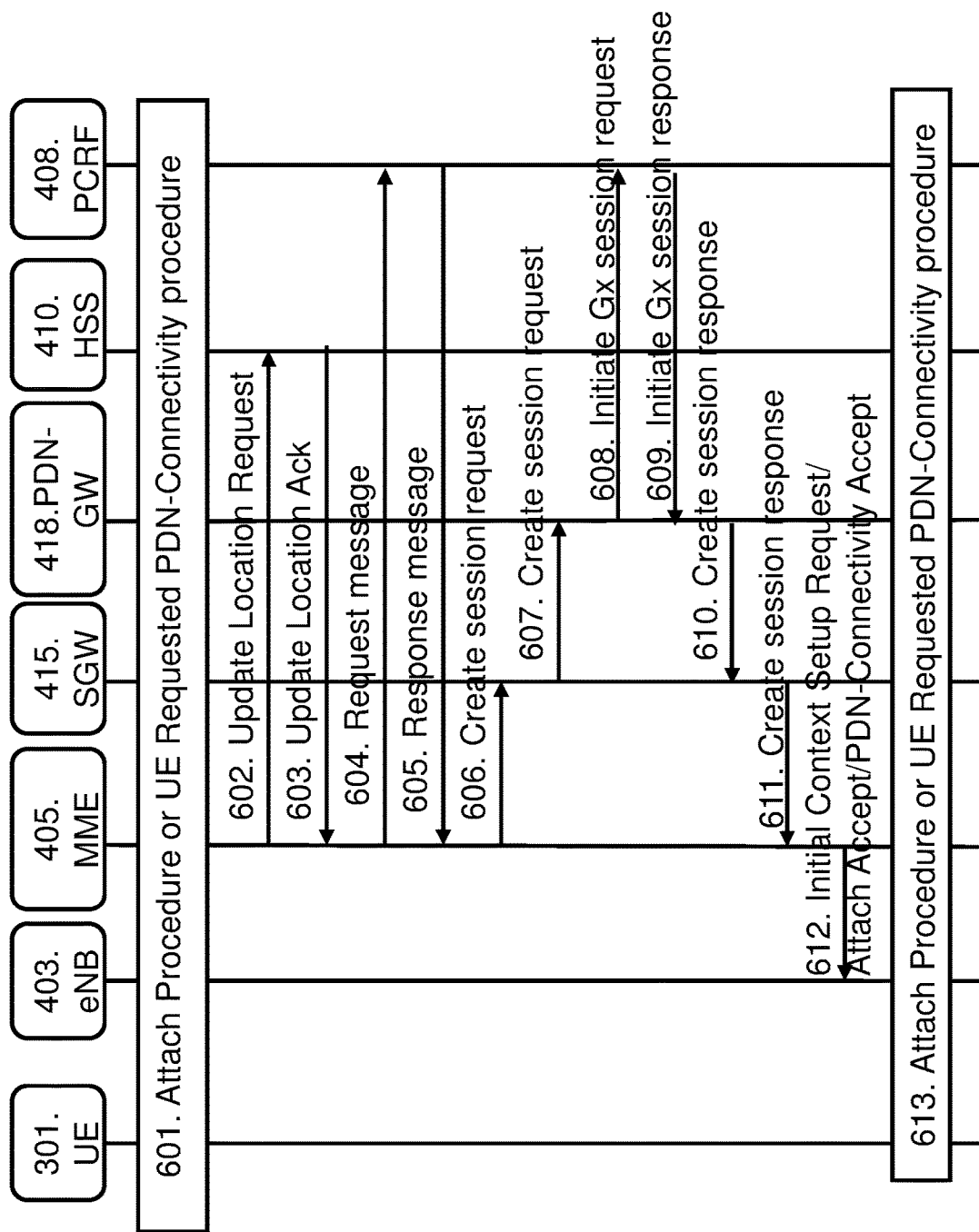
FIG. 6 is a signaling diagram illustrating embodiments of an attach or primary PDP-context activation procedure.
Figure 7:
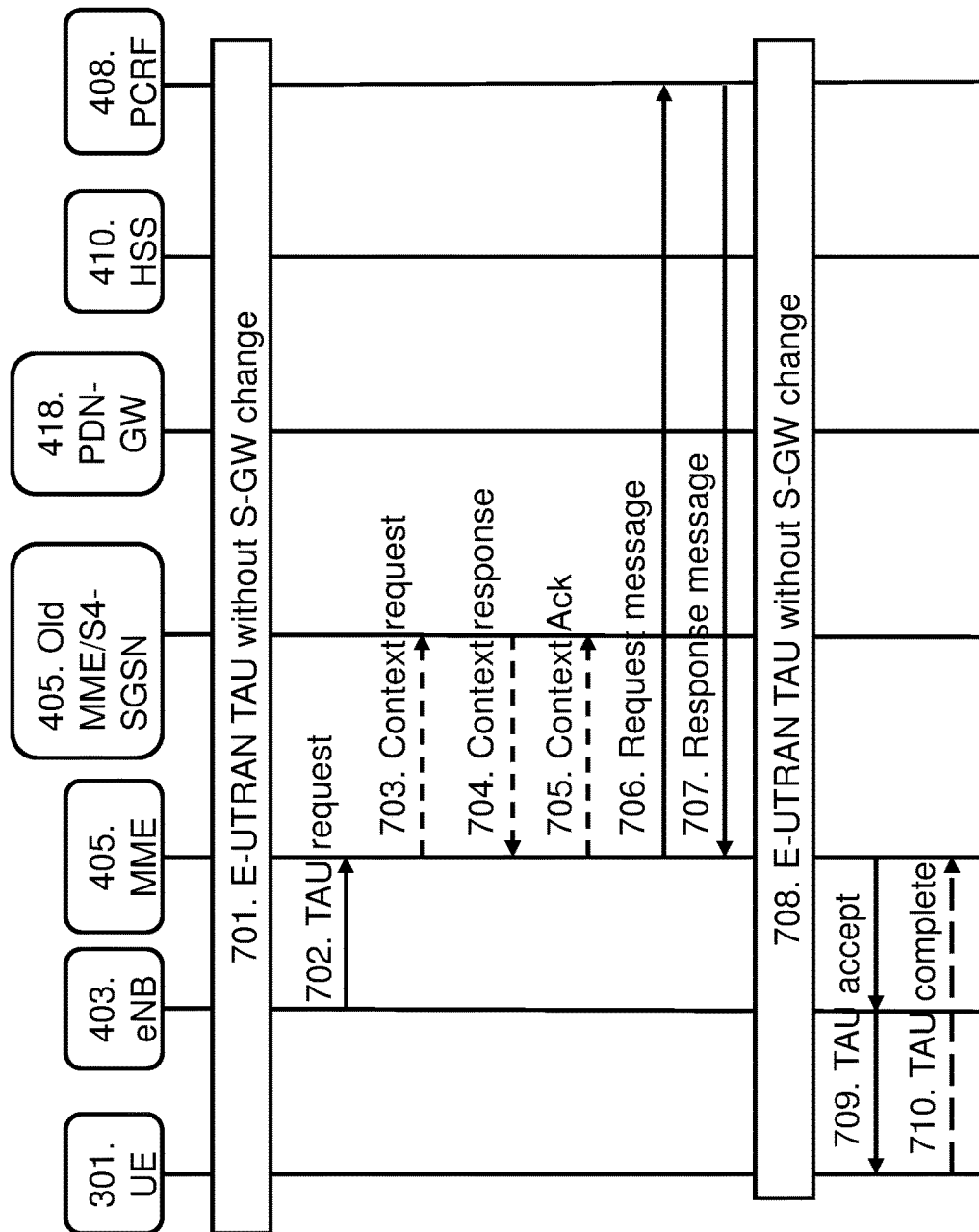
FIG. 7 is a signaling diagram illustrating embodiments of a TAU procedure without SGW change.
Figure 8:
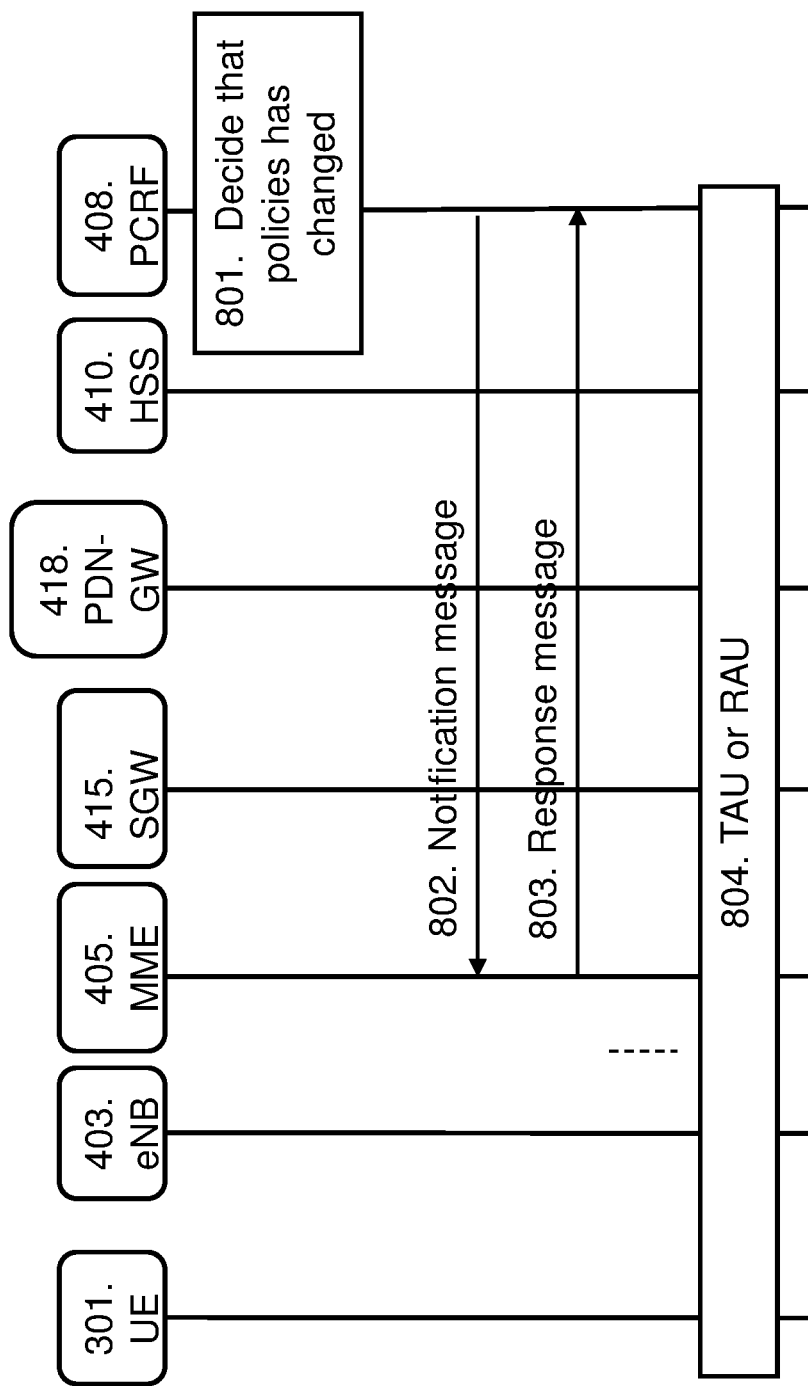
FIG. 8 is a signaling diagram illustrating embodiments of PCRF initiated changes to regional subscription data.

Some embodiments of the method for handling a UEs 301 access to a mobile communications network will now be described with reference to FIGS. 6, 7 and 8 using E-UTRAN access as an example. Note that E-UTRAN is only used as an example, and that the embodiments herein are equally applicable for e.g. UTRAN and GERAN accesses. FIG. 6 illustrates an attach/primary PDP-context activation procedure, FIG. 7 illustrates a TAU without a SGW change and FIG. 8 illustrates a PCRF initiated change to regional subscription data.

Attach/Primary PDP-Context Activation

FIG. 6 is a signaling diagram illustrating an example embodiment of the method for handling a UE 301 access to a mobile communications network in an Attach/Primary PDP-context activation procedure. The method illustrated in FIG. 6 comprises at least some of the following steps, which steps may be performed in any suitable order than described below:

Step 601

An attach procedure or a UE requested PDN-connectivity procedure takes place. The attach procedure may be performed because the UE 301 needs to register with the network to receive services that require registration. The UE requested PDN-connectivity procedure is a procedure initiated by the UE 301 to request PDN connectivity for the UE 301.

Step 602

The MME 405 sends an Update Location Request message to the HSS 410. The request message indicates the MME's 405 support for regional access restrictions functionality.

Step 603

The HSS 410 acknowledges the Update Location request message in step 602 by sending an Update Location Acknowledgement (Ack) message back to the MME 405. With the current technology, if due to regional subscription restrictions the UE 301 is not allowed to attach in the TA, the MME 405 rejects the Attach Request/PDN-Connectivity procedure with an appropriate cause. However with the embodiments herein this decision is deferred until step 605 below.

Step 604

Figure 5:
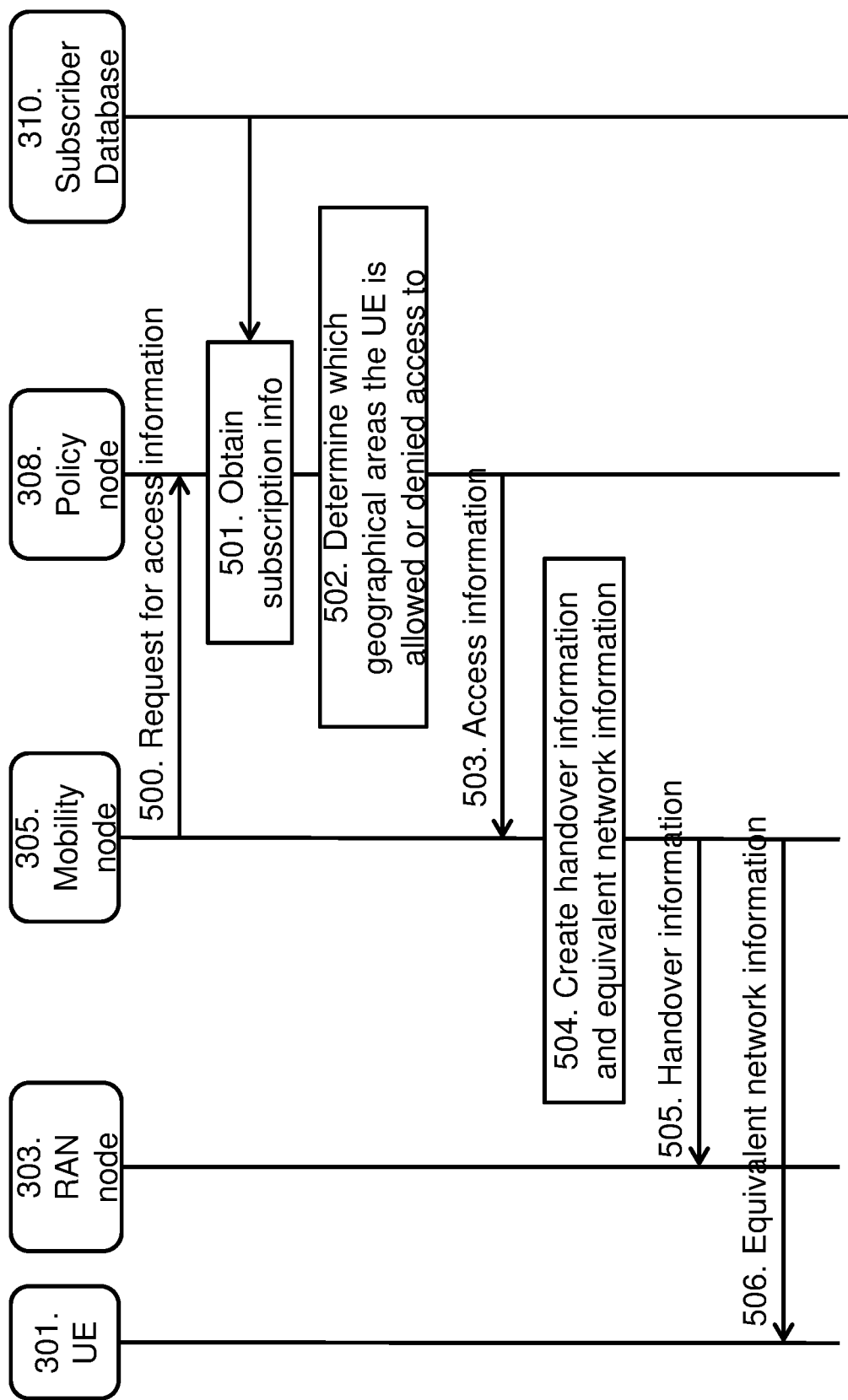
FIG. 5 is a signaling diagram illustrating embodiments of a method.

This step corresponds to step 500 in FIG. 5. The MME 405 sends a request message to the PCRF 408 over a direct interface. The request message is a request for access information and comprises information which indicates that the MME 405 has support for regional access restrictions. The MME 405 also includes at least one of the PLMN-ID, RAT, TAI/RAI, MSISDN, IMSI, International Mobile Equipment Identity (IMEI) and APN in the request message.

Step 605

This step corresponds to step 502 and step 503 in FIG. 5. Based on policies and considering subscription information retrieved from the subscriber database 310 (e.g. the SPR), the PCRF 408 decides which geographical areas that the UE 301 is allowed and not allowed to access and provides this information in a response message sent back to the MME 405. This information may be handover information (e.g. organized in the form of a list such as a HRL) indicating allowed and not allowed TA, RA per access technology (e.g. 2G/3G/4G) and PLMN-ID. The PCRF 408 may also request from the MME 405 to be informed about TA/RA changes for this UE 301. If due to regional subscription restrictions the UE 301 is not allowed to attach in the TA, the MME 405 rejects the Attach Request/PDN-Connectivity procedure from step 601 with an appropriate cause for the rejection. If the Attach Request/PDN-Connectivity procedure in step 601 was rejected due to regional subscription, roaming restrictions or access restrictions, the MME 405 may terminate the associated session towards the PCRF 408 (e.g. the direct interface between the MME 405 and the PCRF 408).

Step 606

The MME 405 sends a Create Session Request message to the SGW 415.

Step 607

The SGW 415 sends the Create Session Request to the PDN-GW 418.

Step 608

The PDN-GW 418 initiates a new Gx session with the PCRF 408 by sending an initiate Gx session request message to the PCRF 408.

Step 609

The PCRF 408 responds to the Gx session request in step 608 by sending an initiate Gx session response message back to the PDN-GW 418.

Step 610

The PDN-GW 418 sends a Create Session Response message to the SGW 415. The response message is a response to the request message in step 607.

Step 611

The SGW 415 sends the Create Session Response message to the MME 405. The response message is a response to the request message in step 606.

Step 612

This step corresponds to step 504, step 505 and step 506 in FIG. 5. The MME 405 constructs the handover information (e.g. a HRL), based on the access restrictions received from the PCRF 408 in step 605. Furthermore, the MME 405 may also construct the equivalent network information (e.g. the NAS equivalent PLMN list). Note that the information provided by the PCRF 408 may supersede any potential access restrictions received from HSS 410 or MME local configuration. The MME 405 sends one of an Initial Context Setup Request message, an Attach Accept message or a PDN-Connectivity Accept message The Initial Context Setup Request message may comprise the HLR and is sent to the eNodeB 403. The Attach Accept message may comprise the equivalent network information and is sent to the UE 301.

Step 613

In case of an attach procedure or an UE requested PDN-connectivity procedure was initiated in step 601, this procedure now continues.

TAU Without SGW Change

FIG. 7 is a signaling diagram illustrating an example embodiment of the method for handling a UEs 301 access to a mobile communications network in a TAU procedure without SGW 415 change. The method illustrated in FIG. 7 comprises at least some of the following steps, which steps may be performed in any suitable order than described below:

Step 701

An E-UTRAN TAU procedure without SGW 415 change takes place. A tracking area update procedure is initiated by the UE 301 and occurs when a GPRS-attached or E UTRAN-attached UE 301 enters a new tracking area, when a tracking area timer has expired etc. This may involve that the UE 301 sends a TAU request message to the eNodeB 403.

Step 702

The eNodeB 403 forwards the TAU Request message to the new MME 405.

Step 703

In case the new MME 405 detects that there has been an MME/SGSN 405 change, the new MME 405 sends a Context Request message to the old MME/ SGSN 405 to retrieve the user information. If the new MME 405 does not detect that there has been any MME/SGSN change, step 703, 704 and 705 are skipped. This is indicated with dotted arrows in FIG. 7.

Step 704

If the Context Request message is sent to an old MME/SGSN 405 in step 703, the old MME/SGSN 405 responds by sending a Context Response message to the MME 405.

Step 705

The new MME 405 sends a Context Acknowledge message to the old MME/SGSN 405. In case the old MME/SGSN 405 has an ongoing session towards the PCRF 408, then this session is now terminated by the old MME/SGSN 405 (not illustrated in FIG. 7).

Step 706

This step corresponds to step 500 in FIG. 5. If the TA has changed and the PCRF 408 has requested to be updated on TA changes (as described in relation to FIG. 6, step 605) then the MME 405 sends a request message to the PCRF 408 and includes the new TAI. If there has been a MME/SGSN 405 change, the new MME 405 sends a request to the PCRF 408 over a direct interface and indicates that the MME 405 supports regional access restrictions. The MME 405 also includes at least one of the PLMN-id, RAT, TAI/RAI, MSISDN, IMSI, IMEI and APN in the request message.

Step 707

This step corresponds to step 502 and step 503 in FIG. 5. Based on policies and considering subscription information retrieved from the SPR, the PCRF 408 decides which geographical areas that are allowed/not allowed for the UE 301 to access and provides this information in a response back to the MME 405. This information contains e.g. a list of not allowed TA, RA per access technology (e.g. 2G/3G/4G) and PLMN-id. If the request message in step 706 was from a new MME 405, the PCRF 408 also requests from the MME 405 to be informed about TA changes for this UE 301. If due to regional subscription restrictions the UE 301 is not allowed to attach in the TA, the MME 405 rejects the TAU procedure with an appropriate cause for the rejection. If the TAU request was rejected due to regional subscription, roaming restrictions or access restrictions the MME 405 may terminate the associated session towards the PCRF 408.

Step 708

The E-UTRAN TAU procedure continues in step 708.

Step 709

This step corresponds to step 504, step 505 and step 506 in FIG. 5. The MME 405 constructs the equivalent network information, e.g. in the form of a NAS equivalent PLMN list. Note that the information provided by the PCRF 408 may supersede any potential access restrictions received from HSS 410 or MME local configuration. The MME 405 sends a Tracking Area Update Accept message to the UE 301. The equivalent network information is included to the UE 301 if required. The TAU Accept message may be sent via the eNodeB 403 to the UE 301.

Step 710

If the UE 301 detects from the TAU accept message in step 709 that a Globally Unique Temporary UE Identity (GUTI) has been changed, the UE 301 may acknowledge the new GUTI by returning a Tracking Area Update Complete message to the MME 405. If there has not been any GUTI change, this step 710 is not performed, indicated with a dotted arrow in FIG. 7.

As mentioned above, FIG. 7 illustrates a TAU procedure without SGW change. However, the same principles also apply for a RAU procedure and a TAU procedure with SGW change.

Handover Procedures

For a S1 handover, the Handover Restriction List may be provided by the target MME 405 already when Handover Request is sent to the Target eNodeB 403. Prior to this step it may be possible for the target MME 405 to interact with the PCRF 408 over the direct interface in order to retrieve updated information regarding allowed/not allowed TA/RA. However, this information may take too long time to obtain due to the extra signaling and processing in the PCRF 408 and the MME 405. Since handover procedures are very time critical, they may not be recommended. However, since the initiated handover is already checked against the Handover Restriction List in the Source eNodeB 403 it is clearly valid and the provisioning of the new handover information (e.g. a HLR) from the Target MME 405 to the Target eNodeB 403 is only related to the next potential handover. The standard 51 handover procedure already includes a TAU procedure and it is in this step that the new handover information and the equivalent network information are created based on input from the PCRF 408.

In addition, for the X2 handover, the procedure is finalized by a TAU procedure. Since a TAU procedure has already been described above, it will not be described here for S1 and X2 handover for the sake of simplicity. Also, mobility procedures for UTRAN and GERAN accesses follows the same principles as described above.

PCRF Initiated Changes to Regional Subscription Data

An exemplary embodiment for handling when internal or external circumstances triggers the PCRF 408 to provision updates to the information regarding regional subscriptions towards the MME 405 will now be described. FIG. 8 is a signaling diagram illustrating an example embodiment of the method for handling a UEs 301 access to a mobile communications network in a PCRF 408 initiated procedure with changes in regional subscription data. The method illustrated in FIG. 8 comprises at least some of the following steps, which steps may be performed in any suitable order than described below:

Step 801

The PCRF 408 takes a decision that the policies for regional subscriptions for a specific PDN-connection/PDP-context has changed. This may for example be the case due to an internal event (time of day/day of week change) or due to information received over external interfaces (data usage reporting over the Gx or the Sd interface, subscription change etc.).

Step 802

This step corresponds to step 503 in FIG. 5. The PCRF 408 sends a Notification message over the direct interface to the MME 405 that handles the associated PDN-connection/PDP-context. The message comprises e.g. a list of not allowed TA, RA per access technology (e.g. 2G/3G/4G) and PLMN-id.

Step 803

The MME 405 acknowledges the message from the PCRF 408 in step 802 by sending a response message to the PCRF 408. The MME 405 further on saves the newly received information for the PDN-connection. Note that if the UE 301 is in EPS Connection Management (ECM) connected mode it may not be possible to immediately update the handover information towards the eNodeB 303, but the MME 405 may have to wait until the next applicable procedure.

Step 804

This step corresponds to step 504 in FIG. 5. At the next Service request message, TAU/RAU or handover, the MME 405 constructs the Handover Restriction List, based on the access restrictions received from the PCRF 408 in step 803. Note that the information provided by the PCRF 408 may supersede any potential access restrictions received from the HSS 410 or MME local configuration. The procedure may either be rejected with an appropriate cause i.e. due to that the UE 301 is located in an area that is not allowed, or accepted in which case the handover information is provided to the eNodeB 303. Step 804 may be performed directly after step 801-803 or some time after steps 801-803, indicated with the dotted line in FIG. 8.

Figure 9:
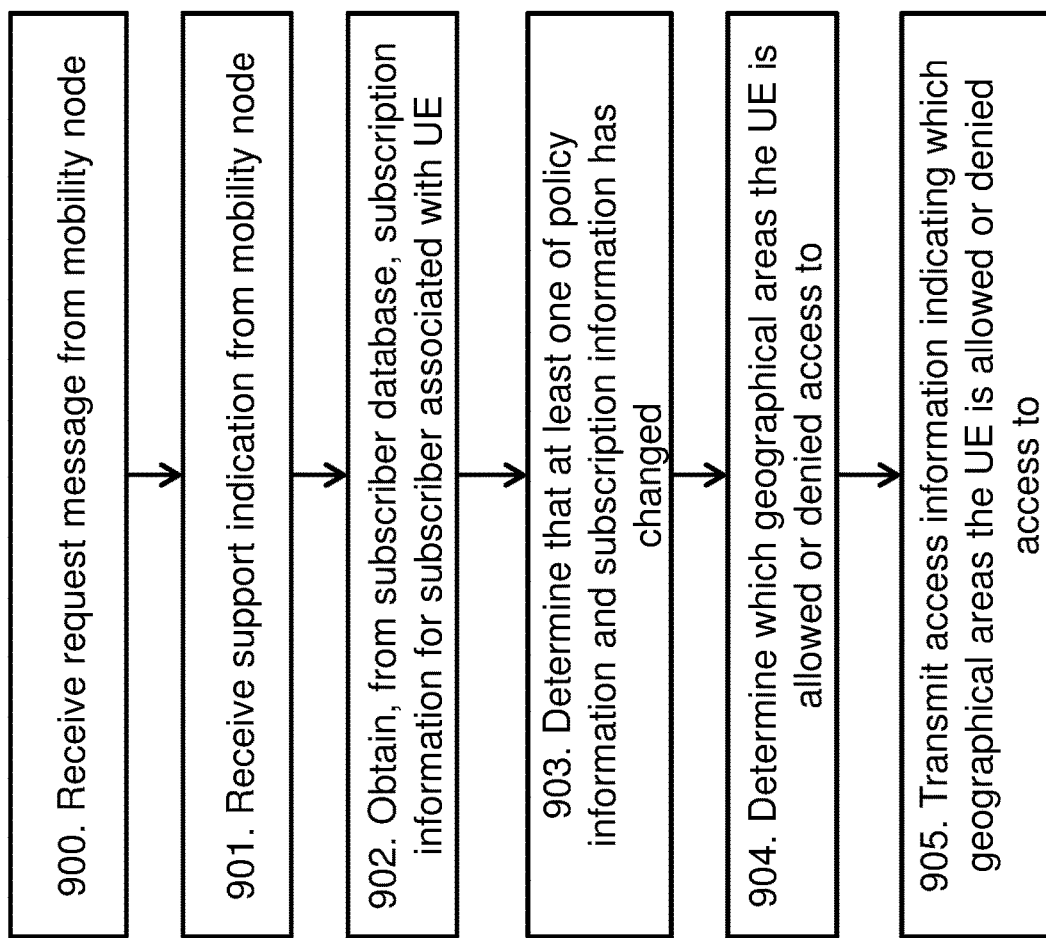
FIG. 9 is a flow chart illustrating embodiments of a method performed by a policy node.

The method described above will now be described seen from the perspective of the policy node 308. FIG. 9 is a flowchart describing the present method in the policy node 308 for handling a UEs 301 access to a mobile communications network. The policy node 308 comprises policy information for the UEs 301 access rights to the mobile communications network. The policy node 308 may be a PCRF node.

The method illustrated in FIG. 9 comprises at least some of the following steps to be performed by the policy node 308:

Step 900

This step corresponds to step 500 in FIG. 5, step 604 in FIG. 6 and step 706 in FIG. 7. In some embodiments, the policy node 308 receives a request message from the mobility node 305. The request message is a request for the access information. The request message may comprise at least one of a UE 301 identity, network identity, information indicating a radio access technology applied by the network and an area identity indicating a logical or geographical region within the network.

The mobility node 305 may be a MME, or a SGSN or a combined MME and SGSN node.

Step 901

This step corresponds to step 604 in FIG. 6 and step 706 in FIG. 7. In some embodiments, the policy node 308 receives, from the mobility node 305, a support indication which indicates that the mobility node 305 supports reception and handling of access information indicating which geographical areas comprised in the mobile communications network the UE 301 is allowed or denied access to.

Step 902

This step corresponds to step 501 in FIG. 5. The policy node 308 obtains, from a subscriber database 310, subscription information for a subscriber associated with the UE 301. The subscriber database 310 may be a SPR.

Step 903

This step corresponds to step 801 in FIG. 8. In some embodiments, the policy node 308 determines that at least one of the policy information and the subscription information has changed. The change may be e.g. compared to previously obtained information.

Step 904

This step corresponds to step 502 in FIG. 5, step 707 in FIG. 7 and step 801 in FIG. 8. Based on the subscription information and the policy information, the policy node 308 determines which geographical areas comprised in the mobile communications network the UE 301 is allowed or denied access to.

The policy information and subscription information used in the decision of which geographical areas comprised in the mobile communications network the UE 301 is allowed or denied access to may be at least one of the changed policy information and changed subscription information.

In some embodiments, the decision of which geographical areas comprised in the mobile communications network the UE 301 is allowed or denied access to is taken when the policy node 308 has determined that at least one of the policy information and subscription information has changed (e.g. step 903).

Step 905

This step corresponds to step 503 in FIG. 5, step 605 in FIG. 6, step 707 in FIG. 7 and step 802 in FIG. 8. The policy node 308 transmits, to a mobility node 305, access information indicating which geographical areas comprised in the mobile communications network the UE 301 is allowed or denied access to. The mobile communications network may be a PLMN and the access information may be per radio access technology and per PLMN identity.

Figure 10:
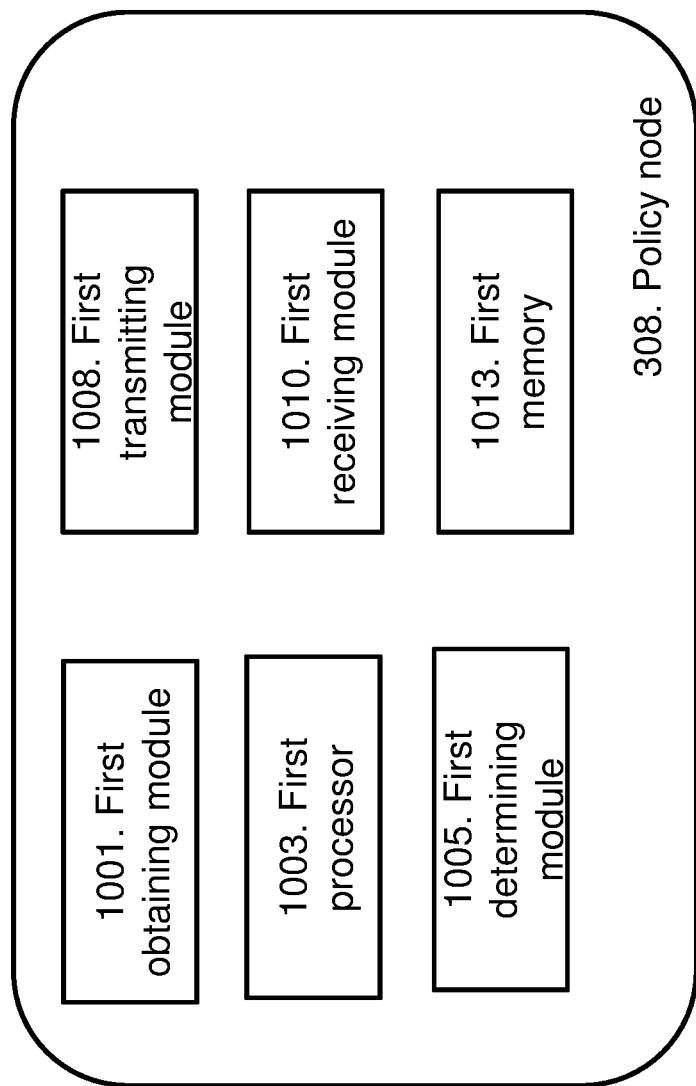
FIG. 10 is a schematic block diagram illustrating embodiments of a policy node.

Embodiments of the policy node 308 configured to perform the method actions handling a UEs 301 access to a mobile communications network, as described above in relation to FIG. 9, is depicted in FIG. 10. The policy node 308 comprises policy information for the UEs 301 access rights to the mobile communications network. The policy node 308 may be a PCRF node, The policy node 308 is arranged to, e.g. by means of a first obtaining module 1001, obtain, from a subscriber database 310, subscription information for a subscriber associated with the UE 301. The first obtaining module 1001 may also be referred to as a first obtaining unit, a first obtaining means, a first obtaining circuit or a first means for obtaining. The first obtaining module 1001 may be a first processor 1003 of the policy node 308. The subscriber database 310 may be a SPR.

The policy node 308 is arranged to, e.g. by means of a first determining module 1005, determine, based on the subscription information and the policy information, which geographical areas comprised in the mobile communications network the UE 301 is allowed or denied access to. The first determining module 1005 may also be referred to as a first determining unit, a first determining means, a first determining circuit or a first means for determining. The first determining module 1005 may be the first processor 1003 of the policy node 308.

The policy node 308 is arranged to, e.g. by means of a first transmitting module 1008, transmit, to a mobility node 305, access information indicating which geographical areas comprised in the mobile communications network the UE 301 is allowed or denied access to. The mobile communications network may be a PLMN and the access information may be per radio access technology and per PLMN identity. The first transmitting module 1008 may also be referred to as a first transmitting unit, a first transmitting means, a first transmitting circuit, a first means for transmitting or a first output unit. The first transmitting module 1008 may be a transmitter, a transceiver etc. The first transmitting module 1008 may be a wireless transmitter of the policy node 308 of a wireless or fixed communications system. The mobility node 305 may be a MME or a SGSN or a combined MME and SGSN node.

In some embodiments, the policy node 308 is arranged to, e.g. by means of a first receiving module 1010, receive a request message from the mobility node 305. The request message is a request for the access information. The request message may comprise at least one of a UE 301 identity, network identity, information indicating a radio access technology applied by the network and an area identity indicating a logical or geographical region within the network. The first receiving module 1010 may also be referred to as a first receiving unit, a first receiving means, a first receiving circuit, a first means for receiving or a first input unit. The first receiving module 1010 may be a receiver, a transceiver etc. The first receiving module 1010 may be a wireless receiver of the policy node 308 of a wireless or fixed communications system.

In some embodiments, the policy node 308 is arranged to, e.g. by means of the first receiving module 1010, receive, from the mobility node 305, a support indication which indicates that the mobility node 305 supports reception and handling of access information indicating which geographical areas comprised in the mobile communications network the UE 301 is allowed or denied access to.

The policy node 308 may be arranged to, e.g. by means of the first determining module 1005, determine that at least one of the policy information and the subscription information has changed. The policy information and subscription information used in the decision of which geographical areas comprised in the mobile communications network the UE 301 is allowed or denied access to may be at least one of the changed policy information and changed subscription information. The decision of which geographical areas comprised in the mobile communications network the UE 301 is allowed or denied access to may be taken when the policy node 308 has determined that at least one of the policy information and subscription information has changed.

The policy node 308 may further comprise a first memory 1013 comprising one or more memory units. The first memory 1013 is arranged to be used to store data, received data streams, power level measurements, access information, subscription information, information about geographical areas, information about allowed and denied geographical areas, policy information, request messages, support indication, changed policy information, policy information, threshold values, time periods, configurations, schedulings, and applications to perform the methods herein when being executed in the policy node 308.

Those skilled in the art will also appreciate that the first obtaining module 1001, the first determining module 1005, the first transmitting module 1008 and the first receiving module 1010 described above may refer to a combination of analogue and digital circuits, and/or one or more processors configured with software and/or firmware, e.g. stored in a memory, that when executed by the one or more processors such as the first processor 1003 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A first computer program may comprise instructions which, when executed on at least one processor, cause the at least one processor (e.g. the first processor 1003) to carry out the method as described in FIG. 9. A first carrier may comprise the first computer program. The first carrier may be one of an electronic signal, optical signal, radio signal or computer readable storage medium.

Figure 11:
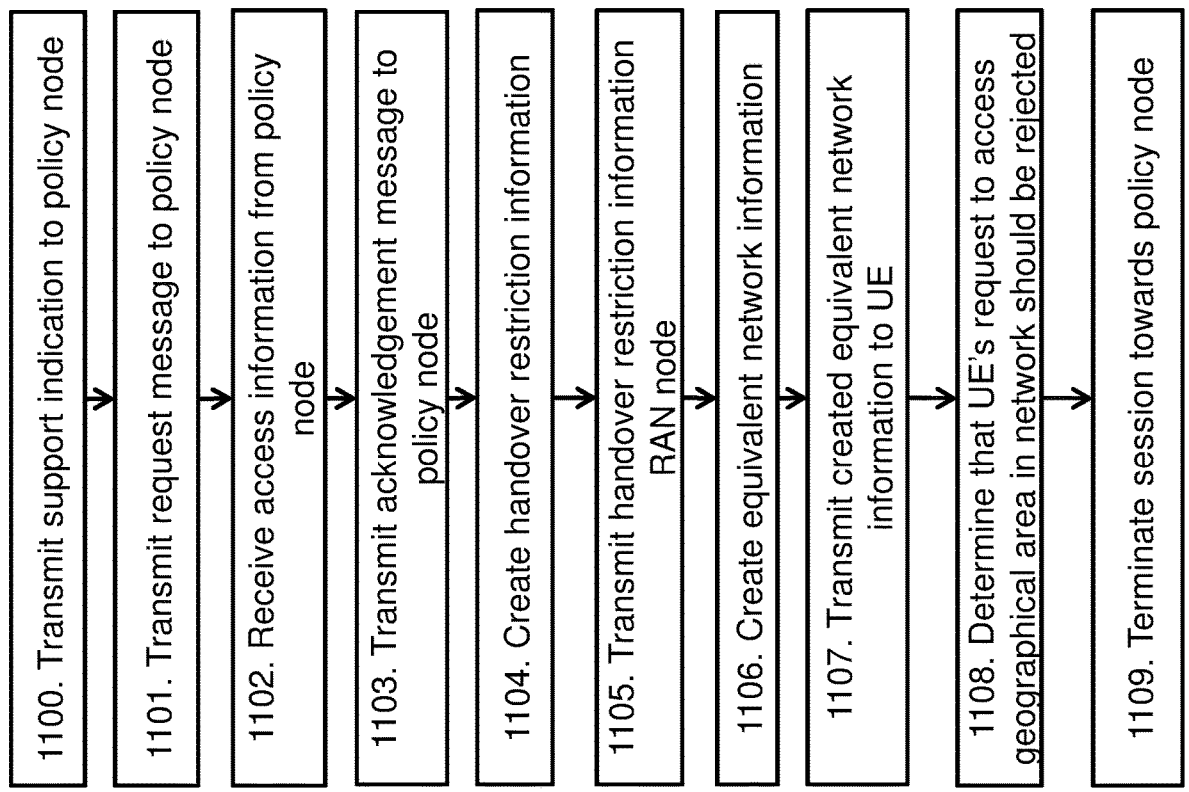
FIG. 11 is a flow chart illustrating embodiments of a method performed by a mobility node.

The method described above will now be described seen from the perspective of the mobility node 305. FIG. 11 is a flowchart describing the present method in the mobility node 305 for handling a UEs 301 access to a mobile communications network. The mobility node 305 may be a MME or a SGSN or a combined MME and SGSN node. The method illustrated in FIG. 10 comprises at least some of the following steps to be performed by the mobility node 305:

Step 1100

This step corresponds to step 604 in FIG. 6 and step 706 in FIG. 7. In some embodiments, the mobility node 305 transmits, to the policy node 308, a support indication which indicates that the mobility node 305 supports reception and handling of access information indicating which geographical areas comprised in the mobile communications network the UE 301 is allowed or denied access to. The policy node 308 may be a PCRF node.

Step 1101

This step corresponds to step 500 in FIG. 5, step 604 in FIG. 6 and step 706 in FIG. 7. In some embodiments, the mobility node 305 transmits a request message to the policy node 308. The request message is a request for the access information. The request message may comprises at least one of a UE 301 identity, network identity, information indicating a radio access technology applied by the network, and an area identity indicating a logical or geographical region within the network.

Step 1102

This step corresponds to step 503 in FIG. 5, step 605 in FIG. 6, step 707 in FIG. 7 and step 802 in FIG. 8. The mobility node 305 receives, from a policy node 308, access information indicating which geographical areas comprised in the mobile communications network the UE 301 is allowed or denied access to. The access information is based on subscription information for a subscriber associated with the UE 301 and policy information for the UEs 301 access rights to the mobile communications network.

In some embodiments, the access information received from the policy node 308 supersedes access restriction information received from another subscriber database (e.g. another HSS) or local configuration associated with access to geographical areas in the mobility node 305.

The mobile communications network may be a PLMN and the access information may be per radio access technology and per network identity.

Step 1103

This step corresponds to step 803 in FIG. 8. In some embodiments, the mobility node 305 transmits an acknowledgement message to the policy node 308. The acknowledgement message acknowledges the receipt of the access information in step 1102.

Step 1104

This step corresponds to step 504 in FIG. 5 and step 612 in FIG. 6. The mobility node 305 creates handover restriction information based on the received access information from the policy node 308.

Step 1105

This step corresponds to step 505 in FIG. 5, step 612 in FIG. 6 and step 709 in FIG. 7. The mobility node 305 transmits the handover restriction information to a RAN node 303.

Step 1106

This step corresponds to step 504 in FIG. 5, step 612 in FIG. 6 and step 709 in FIG. 7. In some embodiments, the mobility node 305 creates equivalent network information.

Step 1107

This step corresponds to step 506 in FIG. 5. In some embodiments, the mobility node 305 transmits the created equivalent network information to the UE 301.

Step 1108

This step corresponds to step 605 in FIG. 6. In some embodiments, when the access information indicates that UE 301 is not allowed to access a geographical area in the network, the mobility node 305 determines that the UE's 301 request to access the geographical area in the network should be rejected.

Step 1109

This step corresponds to step 605 in FIG. 6. In some embodiments, the mobility node 305 terminates the UE's 301 session towards policy node 308. The session is associated with access to the region in the network.

An example of step 1109 may be that if the Attach Request/PDN-Connectivity procedure was rejected due to regional subscription, roaming restrictions or access restrictions the mobility node 305 may terminate the associated session towards the policy node 308 (e.g. via the Sx interface). This may be valid for e.g. Attach/PDN-connectivity. For e.g. TAU the mobility node 305 may reject the TAU procedure, but maintains the PDN-connection and the Sx session towards the policy node 308.

Figure 12:
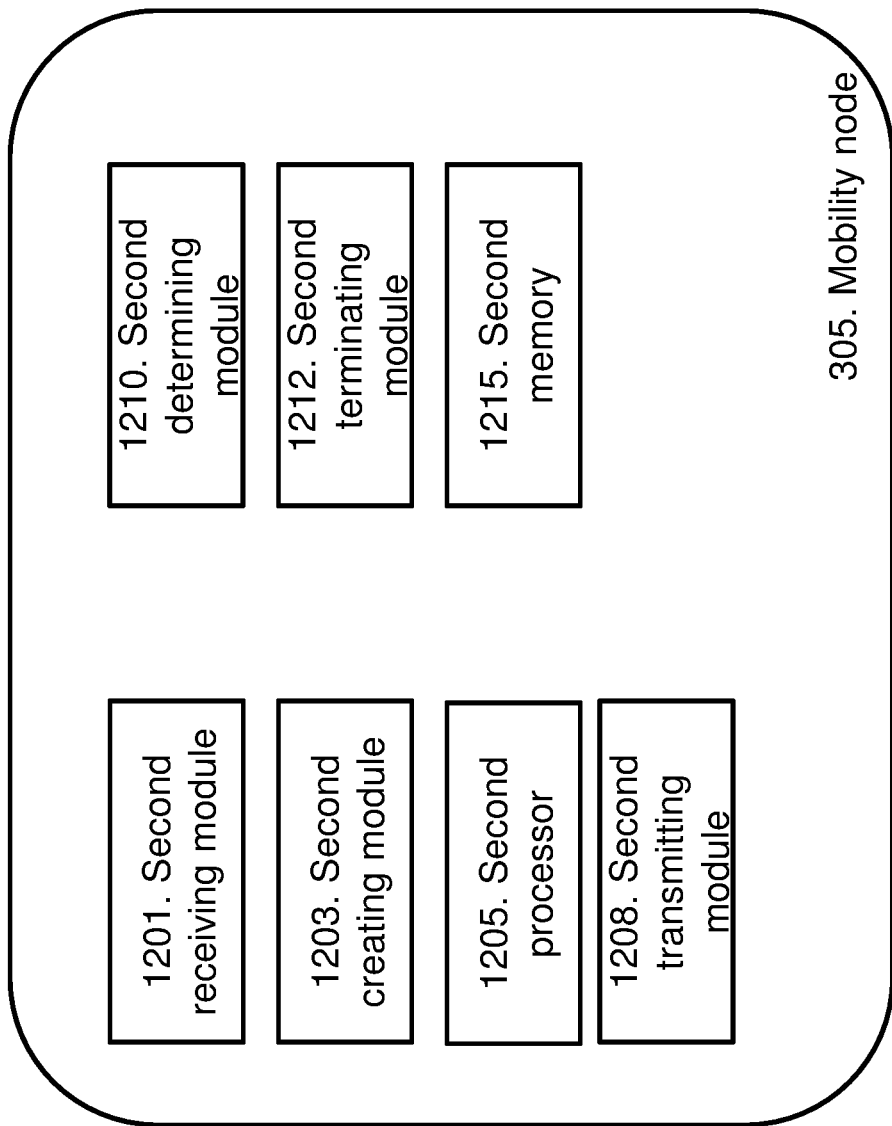
FIG. 12 is a schematic block diagram illustrating embodiments of a mobility node.

Embodiments of the mobility node 305 configured to perform the method actions handling a UEs 301 access to a mobile communications network, as described above in relation to FIG. 11, is depicted in FIG. 12. As mentioned earlier, the mobile communications network may be a PLMN and the access information may be per radio access technology and per network identity. The mobility node 305 may be a MME or a SGSN or a combined MME and SGSN node.

The mobility node 305 is arranged to, e.g. by means of a second receiving module 1201, receive, from a policy node 308, access information indicating which geographical areas comprised in the mobile communications network the UE 301 is allowed or denied access to. The access information is based on subscription information for a subscriber associated with the UE 301 and policy information for the UEs 301 access rights to the mobile communications network. The access information received from the policy node 308 may supersede access restriction information received from another subscriber database or local configuration associated with access to geographical areas in the mobility node 305. The second receiving module 1201 may also be referred to as a second receiving unit, a second receiving means, a second receiving circuit, second means for receiving or a second input unit. The second receiving module 1201 may be a receiver, a transceiver etc. The second receiving module 1201 may be a wireless receiver of the mobility node 305 of a wireless or fixed communications system. The policy node 308 may be a PCRF node.

The mobility node 305 is arranged to, e.g. by means of a second creating module 1203, create handover restriction information based on the received access information from the policy node 308. The second creating module 1203 may also be referred to as a second creating unit, a second creating means, a second creating circuit, means for creating etc. The second creating module 1203 may be a second processor 1205 of the mobility node 305.

The mobility node 305 is arranged to, e.g. by means of a second transmitting module 1208, transmit the handover restriction information to a RAN node 303. The second transmitting module 1208 may also be referred to as a second transmitting unit, a second transmitting means, a second transmitting circuit, second means for transmitting or a second output unit. The second transmitting module 1208 may be a transmitter, a transceiver etc. The second transmitting module 1208 may be a wireless receiver of the mobility node 305 of a wireless or fixed communications system.

In some embodiments, the mobility node 305 is arranged to, e.g. by means of the second creating module 1203, create equivalent network information.

In some embodiments, the mobility node 305 is arranged to, e.g. by means of the second transmitting module 1208, transmit the created equivalent network information to the UE 301.

In some embodiments, the mobility node 305 is arranged to, e.g. by means of the second transmitting module 1208, transmit a request message to the policy node 308. The request message is a request for the access information. The request message may comprise at least one of a UE 301 identity, network identity, information indicating a radio access technology applied by the network, and an area identity indicating a logical or geographical region within the network (e.g. RAI or TAI).

In some embodiments, the mobility node 305 is arranged to, e.g. by means of the second transmitting module 1208, transmit, to the policy node 308, a support indication which indicates that the mobility node 305 supports reception and handling of access information indicating which geographical areas comprised in the mobile communications network the UE 301 is allowed or denied access to.

In some embodiments, the mobility node 305 is arranged to, e.g. by means of a second determining module 1210, when the access information indicates that UE 301 is not allowed to access a geographical area in the network, determine that the UE's 301 request to access the geographical area in the network should be rejected. The second determining module 1210 may also be referred to as a second determining unit, a second determining means, a second determining circuit, second means for determining etc. The second determining module 1210 may be the second processor 1205 of the mobility node 305.

In some embodiments, the mobility node 305 is arranged to, e.g. by means of a second terminating module 1213, terminate the UE's 301 session towards policy node 308. The session is associated with access to the region in the network. The second terminating module 1213 may also be referred to as a second terminating unit, a second terminating means, a second terminating circuit, second means for terminating etc. The second terminating module 1213 may be the second processor 1205 of the mobility node 305.

In some embodiments, the mobility node 305 is arranged to, e.g. by means of the second transmitting module 1208, transmit an acknowledgement message to the policy node 308. The acknowledgement message acknowledges the receipt of the access information.

The mobility node 305 may further comprise a second memory 1215 comprising one or more memory units. The second memory 1215 is arranged to be used to store data, received data streams, power level measurements, access information, subscription information, information about geographical areas, information about allowed and denied geographical areas, policy information, request messages, support indication, changed policy information, policy information, threshold values, time periods, configurations, schedulings, and applications to perform the methods herein when being executed in the mobility node 305.

Those skilled in the art will also appreciate that the second receiving module 1201, the second creating module 1203, the second transmitting module 1208, the second transmitting module 1210 and the second terminating module 1212 described above may refer to a combination of analogue and digital circuits, and/or one or more processors configured with software and/or firmware, e.g. stored in a memory, that when executed by the one or more processors such as the second processor 1205 perform as described above. One or more of these processors, as well as the other digital hardware, may be included in a single ASIC, or several processors and various digital hardware may be distributed among several separate components, whether individually packaged or assembled into a SoC.

A second computer program may comprise instructions which, when executed on at least one processor, cause the at least one processor (e.g. the second processor 1205) to carry out the method as described in FIG. 11. A second carrier may comprise the second computer program. The second carrier may be one of an electronic signal, optical signal, radio signal or computer readable storage medium.

The present mechanism for handling a UEs 301 access to a mobile communications network, may be implemented through one or more processors, such as a first processor 1003 in the policy node arrangement depicted in FIG. 10 and a second processor 1205 in the mobility node arrangement depicted in FIG. 12, together with computer program code for performing the functions of the embodiments herein. The processor may be for example a Digital Signal Processor (DSP), ASIC processor, Field-programmable gate array (FPGA) processor or micro processor. The program code mentioned above may also be provided as a computer program product, for instance in the form of a data carrier carrying computer program code for performing the embodiments herein when being loaded into at least one of the policy node 308 and the mobility node 305. One such carrier may be in the form of a CD ROM disc. It is however feasible with other data carriers such as a memory stick. The computer program code may furthermore be provided as pure program code on a server and downloaded to at least one of the policy node 308 and the mobility node 305.

Summarized, the embodiments herein allow for the mobility node 305 to request access information (e.g. Regional Subscription information) from the policy node 308 over a direct interface and to allow the policy node 308 to provide this information to the mobility node 305 based on subscription and IP-CAN session specific information such as location, accumulated data usage, terminal type etc.

The mobility node 305 may request the access information from the policy node 308 during Initial Attach/PDP-Context activation and in addition during certain mobility procedures.

If the mobility node 305 has requested the access information from the policy node 305, then the policy node 305 may evaluate which geographical areas that are allowed/not allowed and provide this information back to the mobility node 305. Geographical Areas may be one or several Tracking Areas, Routing Areas. The exact format of the information provided from the policy node 308 to the mobility node 305 may be, but is not limited to, a list of not allowed TA/RAs per PLMN and access type, a range of not allowed TA/RAs per PLMN and access type.

The mobility node 305 then takes the information on not allowed areas from the policy node 308 into account and takes a decision to accept or reject the ongoing mobility procedure (e.g. attach, TAU/RAU, handover) towards the UE 301. If the procedure is accepted the mobility node 305 builds the handover information (e.g. a HRL) taking the policy node provided information into account and provides the handover information to the RAN node 303, e.g. an eNodeB or a RNC. Furthermore, the mobility node 305 builds the equivalent network information and provides this to the UE 301.

The Zone Codes from HSS 410 are ignored, if provided. Local configuration in the mobility node 305 may be overridden if the access information is provided by the policy node 308.

During mobility procedures the not allowed areas may be updated by the policy node 308. The policy node 308 may also unsolicited update the not allowed areas to the mobility node 305. In this case the mobility node 305 may take the updated information into account the next occasion when the handover information is provided to the RAN node 303 and the equivalent network information is provided to the UE 301, e.g. at the next periodic TAU or service request.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method in a policy node for handling a User Equipment's, UE's, access to a mobile communications network, wherein the policy node comprises policy information for the UE's access rights to the mobile communications network, the method comprising:
   receiving a request message from a mobility node, wherein the request message is a request for access restriction information for the UE;
   based on the policy information and obtained subscription information for the UE, determining which geographical areas comprised in the mobile communications network the UE is allowed or denied access to; and
   transmitting, to the mobility node, over a direct interface between the policy node and the mobility node, access restriction information comprising geographical areas in the mobile communications network the UE is allowed or denied access to, wherein the geographical areas comprise a list of one or more allowed or denied tracking areas.

2. The method according to claim 1 where the subscription information is obtained from a Subscription database.

3. The method according to claim 1 wherein the request message is a request for access restriction information during a registration of the UE with an initial mobility node.

4. The method according to claim 1 wherein the request message is a request for access restriction information during a tracking area change by the UE with a new mobility node.

5. The method according to claim 1 wherein the mobility node is either the initial mobility node or the new mobility node.

6. The method according to claim 1, wherein the request message comprises at least one of a UE identity, network identity, information indicating a radio access technology applied by the mobile communications network, and an area identity indicating a logical or geographical region within the mobile communications network.

7. The method according to claim 1, further comprising:
   receiving, from the mobility node, a support indication which indicates that the mobility node supports reception and handling of the access information indicating which geographical areas comprised in the mobile communications network the UE is allowed or denied access to.

8. The method according to claim 1, further comprising:
   determining that at least one of the policy information and the subscription information has changed;
   wherein the policy information and the subscription information used in the decision of which geographical areas comprised in the mobile communications network the UE is allowed or denied access to is at least one of the changed policy information and the changed subscription information; and wherein the decision of which geographical areas comprised in the mobile communications network the UE is allowed or denied access to is taken when the policy node has determined that at least one of the policy information and subscription information has changed.

9. The method according to claim 1, wherein the mobile communications network is a PLMN and the access information is per the radio access technology and per the PLMN identity.

10. The method of claim 1 further comprising determining change to the access restriction information and, sending a notification to the mobility node indicating the changed access restriction information.

11. A method in a mobility node for handling a User Equipment's, UE's, access to a mobile communications network, the method comprising:
   sending a request message to a policy node, wherein the request message is a request for access restriction information for the UE;
   receiving, from the policy node, over a direct interface between the policy node and the mobility node, access restriction information comprising geographical areas in the mobile communications network the UE is allowed or denied access to, wherein the geographical areas comprise a list of one or more allowed or denied tracking areas and wherein the access restriction information is based on subscription information of the UE and policy information for the UE's access rights to the mobile communications network;
   creating handover restriction information based on the received access information from the policy node; and
   transmitting the handover restriction information to a Radio Access Network, RAN, node serving the UE.

12. The method according to claim 11, further comprising:
   creating equivalent network information based on the access restriction information; and
   transmitting the created equivalent network information to the UE over a Non-Access Stratum (NAS) message.

13. The method according to claim 11 further comprising establishing a policy session with the policy node.

14. The method according to claim 11 wherein the request message is a request for access restriction information during a registration of the UE.

15. The method according to claim 11 wherein the request message is a request for access restriction information during a tracking area change by the UE.

16. The method according to claim 11, wherein the request message comprises at least one of a UE identity, network identity, information indicating a radio access technology applied by the mobile communications network, and an area identity indicating a logical or geographical region within the mobile communications network.

17. The method according to claim 11, further comprising:
   transmitting, to the policy node, a support indication which indicates that the mobility node supports reception and handling of the access information indicating which geographical areas comprised in the mobile communications network the UE is allowed or denied access to.

18. The method according to claim 13, further comprising:
   when the access restriction information indicates that the UE is not allowed to access a geographical area in the network, determining that the UE's request to access the geographical area in the mobile communications network should be rejected; and
   and terminating the policy session with the policy node.

19. A non-transitory computer-readable medium having stored thereon computer-executable instructions that, when executed by a processor, cause the processor to:
   receive a request message from a mobility node, wherein the request message is a request for access restriction information for a User Equipment, UE;
   based on the policy information and obtained subscription information for the UE, determine which geographical areas comprised in the mobile communications network the UE is allowed or denied access to; and
   transmit, to the mobility node, over a direct interface between the policy node and the mobility node, access restriction information comprising geographical areas in the mobile communications network the UE is allowed or denied access to, wherein the geographical areas comprise a list of one or more allowed or denied tracking areas.

* * * * *

UNITED STATES PATENT AND TRADEMARK OFFICE
CERTIFICATE OF CORRECTION

PATENT NO. : 11,671,831 B2
APPLICATION NO. : 17/838041
DATED : June 6, 2023
INVENTOR(S) : Stenfelt et al.

It is certified that error appears in the above-identified patent and that said Letters Patent is hereby corrected as shown below:

In the Specification

In Column 1, Line 6, delete "2017," and insert -- 2017, now Pat. No. 11,375,372, --, therefor.

In Column 1, Line 45, delete "Policy Control and Charging Rules Function (PCRF)" and insert -- Policy and Charging Rules Function (PCRF) --, therefor.

In Column 3, Line 55, delete "Regional Subscription Zone code Identity (RSZI)" and insert -- Regional Subscription Zone Identity (RSZI) --, therefor.

In Column 9, Lines 33-34, delete "Open Systems Interconnection model (OSI) model)." and insert -- Open Systems Interconnection (OSI) model). --, therefor.

In Column 17, Lines 10-11, delete "Globally Unique Temporary UE Identity (GUTI)" and insert -- Globally Unique Temporary Identity (GUTI) --, therefor.

In Column 17, Line 38, delete "51 handover" and insert -- S1 handover --, therefor.

In the Claims

In Column 26, Lines 48-49, in Claim 5, delete "the initial mobility node or the new mobility node." and insert -- an initial mobility node or a new mobility node. --, therefor.

In Column 27, Line 12, in Claim 9, delete "the radio access technology" and insert -- a radio access technology --, therefor.

In Column 27, Line 15, in Claim 10, delete "The method of claim" and insert -- The method according to claim --, therefor.

In Column 28, Line 27, in Claim 18, delete "and terminating" and insert -- terminating --, therefor.

Signed and Sealed this
Fifth Day of December, 2023

Katherine Kelly Vidal
*Director of the United States Patent and Trademark Office*

In Column 28, Line 34, in Claim 19, delete "the policy information" and insert -- policy information --, therefor.

In Column 28, Lines 36-37, in Claim 19, delete "the mobile communications network" and insert -- a mobile communications network --, therefor.

In Column 28, Line 39, in Claim 19, delete "the policy node" and insert -- a policy node --, therefor.